United States Patent
Graham

(10) Patent No.: US 8,601,455 B2
(45) Date of Patent: Dec. 3, 2013

(54) REPOSITORY RELATIONSHIP PROGRAMMING

(76) Inventor: Kevin P. Graham, Brentwood, CA (US)

( * ) Notice: Subject to any disclaimer, the term of this patent is extended or adjusted under 35 U.S.C. 154(b) by 155 days.

(21) Appl. No.: 13/169,969

(22) Filed: Jun. 27, 2011

(65) Prior Publication Data

US 2012/0005654 A1    Jan. 5, 2012

Related U.S. Application Data

(63) Continuation of application No. 11/239,849, filed on Sep. 30, 2005, now Pat. No. 7,984,422.

(60) Provisional application No. 60/614,648, filed on Sep. 30, 2004.

(51) Int. Cl.
*G06F 9/44* (2006.01)
*G06F 9/45* (2006.01)

(52) U.S. Cl.
USPC ............................ 717/151; 717/163; 717/165

(58) Field of Classification Search
None
See application file for complete search history.

(56) References Cited

U.S. PATENT DOCUMENTS

| | | | |
|---|---|---|---|
| 4,961,133 A * | 10/1990 | Talati et al. | 717/148 |
| 5,067,072 A * | 11/1991 | Talati et al. | 717/148 |
| 5,889,992 A * | 3/1999 | Koerber | 717/108 |
| 6,002,867 A * | 12/1999 | Jazdzewski | 717/105 |
| 6,212,676 B1 | 4/2001 | Seaman et al. | |
| 6,442,750 B1 | 8/2002 | Lopes et al. | |
| 6,467,086 B1 | 10/2002 | Kiczales et al. | |
| 6,473,895 B1 | 10/2002 | Lopes et al. | |
| 6,539,390 B1 | 3/2003 | Kiczales et al. | |
| 6,757,887 B1 | 6/2004 | Kaplan et al. | |
| 6,907,420 B2 | 6/2005 | Gensel | |
| 7,055,134 B2 * | 5/2006 | Schroeder | 717/120 |
| 7,137,104 B2 | 11/2006 | Tip et al. | |
| 7,234,137 B2 * | 6/2007 | Taylor et al. | 717/167 |
| 7,383,531 B2 * | 6/2008 | Brigham et al. | 717/107 |
| 7,441,231 B1 | 10/2008 | Thompson et al. | |
| 7,627,861 B2 | 12/2009 | Smith et al. | |
| 7,688,960 B1 * | 3/2010 | Aubuchon et al. | 379/201.12 |
| 7,707,554 B1 * | 4/2010 | Kosche et al. | 717/127 |
| 7,788,641 B2 | 8/2010 | Tarr et al. | |
| 2002/0095653 A1 | 7/2002 | Parr et al. | |
| 2004/0015858 A1 * | 1/2004 | Seto et al. | 717/120 |
| 2004/0093581 A1 * | 5/2004 | Nielsen et al. | 717/101 |
| 2004/0172615 A1 * | 9/2004 | Beltran et al. | 717/113 |
| 2005/0172265 A1 * | 8/2005 | Brigham et al. | 717/120 |
| 2005/0204344 A1 | 9/2005 | Shinomi | |
| 2005/0216885 A1 | 9/2005 | Ireland | |
| 2007/0261025 A1 * | 11/2007 | Seto et al. | 717/108 |

OTHER PUBLICATIONS

Kiczales et al., Getting Started With AspectJ, published by Communications of The ACM, Oct. 2001/vol. 44, No. 10, pp. 59-65.*
Hannemann et al., Design Pattern Implementation in Java and AspectJ, published by OOPSLA'02, Nov. 4-8, 2002, pp. 161-173.*

(Continued)

*Primary Examiner* — Tuan Q. Dam
*Assistant Examiner* — Zheng Wei
(74) *Attorney, Agent, or Firm* — Cooley LLP; Vidya R. Bhakar

(57) ABSTRACT

Embodiments of systems, methods and computer program products are described for implementing repository relationship programming. Implementations described herein describe processes for implementing a union of concerns, integrating concerns, assembling concerns and separating concerns.

16 Claims, 12 Drawing Sheets

(56) References Cited

OTHER PUBLICATIONS

Elrad et al., Aspect-oritented programming: Introduction, published by Communications of The ACM, Oct. 2001/vol. 44, No. 10, [Retrieved online: http://cacm.acm.org/magazines/2001/10/7230-aspect-oriented-programming/fulltext, Aug. 5, 2013], pp. 1-4.*

Robert J. Walker et al., "An Initial Assessment of Aspect-Oriented Programming," Proceedings of the 21$^{st}$ International Conference on Software Engineering, May 16-22, 1999, pp. 120-130, IEEE.

Natsuko Noda et al., "On Aspect-Oriented Design—An Approach to Designing Quality Attributes," IEEE, 1999, pp. 230-237, IEEE.

Karl J. Lieberherr et al., "Preventive Program Maintenance in Demeter/Java," ACM, 1997, 2 pages.

Harold Ossher et al., "Multi-Dimensional Separation of Concerns and the Hyperspace Approach," IBM T.J. Watson Research Center, 2000, 30 pages.

Gregor Kiczales et al., "Aspect-Oriented Programming," Proceedings of the European Conference on Object-Oriented Programming, Jun. 1997, 25 pages, Springer-Verlag, Finland.

* cited by examiner

```
class task21;
    public char implementationID / (initialValue='Christmas Bonus');
    public list activeMethod / (initialValue={
                                        'calc01',
                                        'calc02',
                                        'calc03'
                                        });

event 'christmas bonus precondition'  / (method='calc01', send='Before');
    event 'christmas bonus postcondition' / (method='calc01', send='After');

runInterface: method;
        dcl num I;

do i=1 to listlen(activeMethod);
            call send(_self_, getitemc(activeMethod, i));
        end;
    endmethod;

calc01: method;
    endmethod;
    calc02: method;
    endmethod;
    calc03: method;
    endmethod;
endclass;
```

FIG. 2

REPOSITORY RELATIONSHIP PROGRAMMING

This is a continuation application of U.S. application Ser. No. 11/239,849, now U.S. Pat. No. 7,984,422, filed Sep. 30, 2005, which claims the benefit of U.S. Provisional Application No. 60/614,648, filed Sep. 30, 2004. Both of these applications are hereby incorporated by reference herein in their entirety.

TECHNICAL FIELD

Embodiments described herein relate generally to programming systems and methods.

BACKGROUND

As functional complexity increases, or business rules change, the backbone process of computer programs deprecate, made useless by dependencies between decision-logic and task-logic, or made useless by alterations to the data signature that allows interactions between programs.

The current state of the art is starting from scratch with a completely new set of programs, leaving the defects and deficiencies of legacy programs behind, while creating a completely new set of the same. Typically, the protocols for program organization are centered on the naming of programs and program properties.

Programs are generally written to account for "logical steps" of a given process, which gives rise to the tendency to write lengthy programs consisting of decision-logic mixed with task-logic. Alterations to the expected programming process may mandate rewriting entire sections of code. An alteration to a single business rules may indicate the need to rewrite one or more logical processes, to account for the correct implementation of a process series, or sequence, of decisions and related tasks. The convolution of programming logical steps is compounded by the need for cross-program communications, a need usually handled by a series of parameters in the originating program handled by a series of matching parameters in the receiving program. Any change to the expected programming process may also affect the content, sequence, and naming of parameters used in program communication.

Adding new functionality to an existing application is a concept referred to as layering programs. This means new programs need to be inserted at specific points in the process, and some existing programs may need to be updated. The way to implement a new "layer" is to begin the process of rewriting logical steps represented by one or more program modules, accounting for alterations to parameters between programs, and accounting for alterations to the sequence of program execution.

The long term benefits of the traditional approach to computer programming fail to materialize when attempting to integrate legacy program applications with newly developed modules.

SUMMARY

Embodiments of systems, methods and computer program products are described for implementing repository relationship programming. For example, embodiments of a system, method, and computer program product for creating a union relationship (i.e., creating a union of concerns) is described where one or more repository instances capable of being modified are identified in a set of repository instances. In each identified repository instance (i.e., those repository instance(s) determined to be capable of being modified), a union transmitter may be implemented. A determination may then be made as to whether each inclusion instance (in a set of one or more inclusion instances) has a union receptor that matches to a corresponding implemented union transmitter in the identified repository instance(s). After this determination, each matching union receptor may then be enabled.

In one embodiment, the identifying of one of more repository instances capable of being modified may include comparing the set of repository instances to a union baseline/list that identifies repository instances that can be modified. In another embodiment, the identifying one of more repository instances capable of being modified may include determining the presence of a union receptor in each repository instance in the set of repository instances.

In one embodiment, each implemented union transmitter may be intended for a single union receptor. In another embodiment, the union transmitter may be implemented at a union initiation point in the repository instance. In one embodiment, the union initiation point may be identified from a union focus property obtained from a datagram received by a Task Aspect.

In a further embodiment, the set of one or more inclusion instances may be identified from a datagram. In another embodiment, each matched implemented union trigger and enabled union receptor may provide an entry point in the given repository instance (i.e., the repository instance having the implemented union trigger for the associated inclusion instance (i.e., the inclusion instance that has the enable union receptor) to permit the inclusion instance to become a program layer of the receptor instance at runtime. In one embodiment each enabled union receptor may be constrained to the matching union transmitter.

BRIEF DESCRIPTION OF THE DRAWINGS

FIG. 2 is a conceptual representation representing the actual code of the exemplary repository program "task21" shown in FIG. 1;

DETAILED DESCRIPTION

Figure 1:
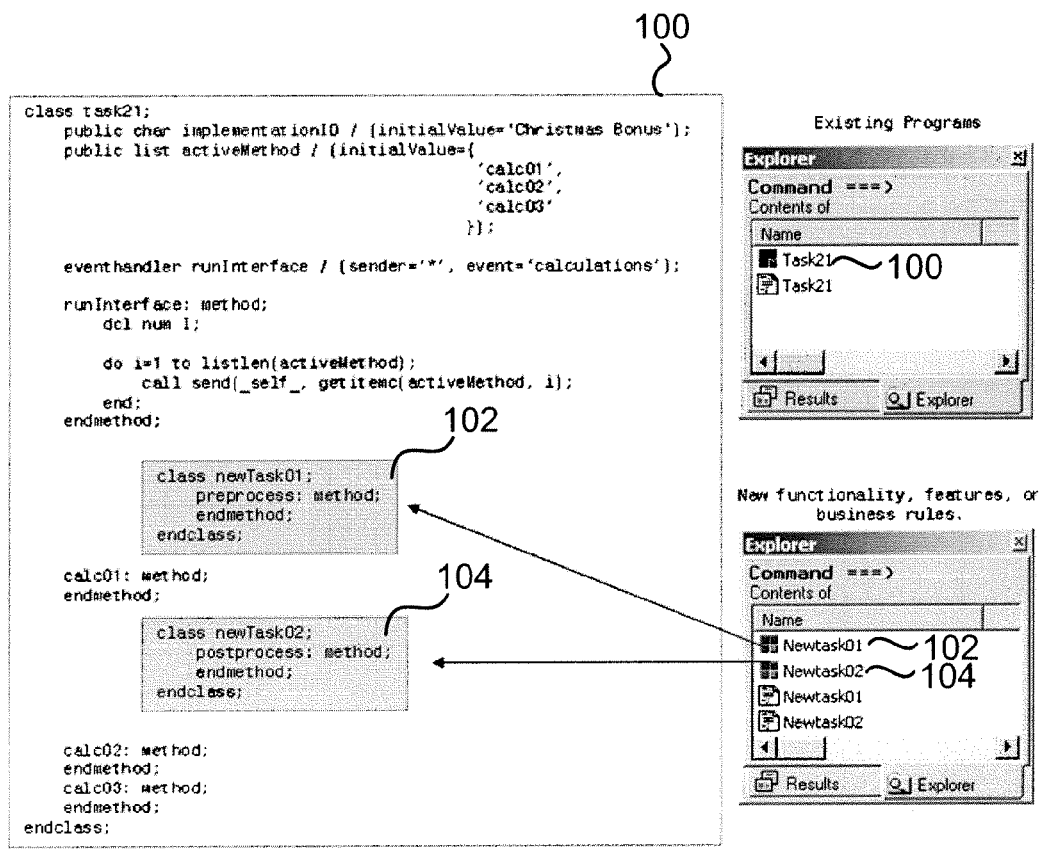
FIG. 1 is a conceptual representation of an exemplary repository program with two behavioral modifications.

Embodiments are described for implementing repository relationship programming involving the union and integration of modular programs where the operations of union and integration are made possible by a combination process involving dynamic communication channels between programs and source code organization. More specifically, embodiments of a system, method, and computer program product are described for creating a relationship union between modular programs.

In accordance with an embodiment of the present invention, the application controller locates and assembles individual programs as a collective, referred to as a repository. The concept of a program repository, or collective, is introduced as classes (programs) that are grouped into a collective and assigned the equivalent of a "Dewey Decimal System identifier", which is used to categorize, sequence, or otherwise visually indicate the intended functionality or usage thereof. The object-identifiers of individual programs can be collected, stored, and used to dynamically create a union between independent programs at runtime. The object-identifier of individual embedded objects (properties) within each program can also be collected, stored, and are used as common properties across programs. The combined operations of a union of concerns followed by the integration of concerns can be used create an environment where legacy programs and new development programs are seamlessly integrated at runtime. A union of concerns is an operation where programs "merge" at specific points after program assembly. The integration of concerns connects common properties between legacy and new development programs that may be located in a plurality of physical locations.

Union of Concerns

Embodiments of a system, method and computer program product for creating a union between multiple programs are described herein. In this process, a data element located in a repository collective program is obtained, stored, and matched against a data element stored within a Task Aspect program. The data element obtained from each repository program (i.e., a repository program data element) includes information that identifies a specific object and categorical use within the application. Examining the repository program data element, a Task Aspect program determines whether or not the repository program should have its properties subjected to an alteration. If the repository program is determined to be an intended target for modifications, the Task Aspect will process the alterations to the properties of the repository program.

In one embodiment, the place marking the transmission point for a union may be obtained from repository programs using specific descriptive information embedded within a program. In another embodiment, the place marking the reception point for a union can be obtained from repository programs using specific descriptive information embedded within a program. In a further embodiment, the object identifiers of union transmitters can be matched to one or more reception points that create union receptors.

With the above description in mind, a union of concerns may generally be defined as the ability to dynamically deviate the process-flow of a legacy program. A plurality of newly developed programs modify the process-flow or data of a specific legacy program, at a specified point. The resulting deviations can enhance, extend, replace, monitor, and/or modify the expected results of the original program without the need to modify legacy source code.

One benefit of a union of programs is that it can remove the need for multiple inheritance. The benefits of a union of concerns becomes apparent in regulated environments, where alterations to source code must be tracked and audited, and in environments where program features are made available or extended, on demand. A union of concerns can provide a seamless mechanism for dynamic program control. Union operations are commonly performed across multiple programs, providing the software developers with an easy way to apply new business rules, at any point, in the form of a precondition or post-condition process. Optionally, the union of concerns process can be used to dynamically replace specifically identified software modules. A union of concerns is about dynamic program interaction for program modules that can be assembled or reassembled—at any time—in order to create feature-based behaviors, using standard business rules specified in metadata, or user interactions specified from a graphical user interface (GUI).

FIG. 1 is a conceptual representation of an exemplary repository program 100 with two behavioral modifications 102, 104. The source code 100 named "task21" represents a legacy program. The source codes 102, 104 named "newTask01" and "newTask02" represent newly developed programs. This illustration demonstrates the conceptual code organization needed to implement a union of concerns across multiple programs.

FIG. 2 is a conceptual representation representing the actual code 200 of the exemplary repository program "task21" 100 shown in FIG. 1. The repository program "task21" 100 at no time contains the hard-coded union triggers that appear as event properties. The event properties are dynamically added to a specified instance, implementing a redirect of the expected program process-flow, and deviating before and after execution of the method named "calc01". In FIG. 2, the two lines of code 202, 204 indicate that new properties are created dynamically, after object instantiation. A relationship conductor named "aspect01" creates the new properties. This illustration demonstrates the actual code organization needed to implement a union of concerns within a single program targeted for behavior modification, where the union comprises an inclusion of two new programs that are added dynamically to the application. This is how legacy source code can remain free of alterations, while newly developed programs add-on to existing application functionality or modify existing application process.

With the assistance of the exemplary implementation set forth in operations A-1 through A-7, further details of various embodiments for creating a union of concerns will be described.

In operation A-1, as set forth in the exemplary code below, the Task Aspect receives a datagram that comprises information that uniquely identifies instances upon which the Task Aspect will perform one or more property modifications. Instances matched to this information are referred to as the union baseline and contain a known focus point that is matched to the union initiation point.

| OPERATION A-1: |
| --- |

```
class taskManager;
    public list components / (sendEvent='N');
```

| OPERATION A-2: |
| --- |

```
class taskManager;
    public list components / (sendEvent='N');
    public list unionInformation / (sendEvent='N');
    setFocus1: method;
        dcl num rc;
        rc=insertc(unionInformation, 'calc01', -1, 'union focus property');
        rc=insertc(unionInformation, 'before', -1, 'union focus sequence');
        rc=insertc(unionInformation, 'christmas bonus precondition', -1, 'union focus
            transmitter');
        dcl object thisProgram=getnitemo(components, 'aspect001');
        thisProgram.loadFocus(unionInformation);
    endmethod;
    setFocus2: method;
        dcl num rc;
        rc=insertc(unionInformation, 'calc01', -1, 'union focus property');
        rc=insertc(unionInformation, 'after', -1, 'union focus sequence');
        rc=insertc(unionInformation, 'christmas bonus postcondition', -1, 'union focus
            transmitter');
        dcl object thisProgram=getnitemo(components, 'aspect001');
        thisProgram.unionFocus(unionInformation);
    endmethod;
endclass;
class taskAspect;
    public char name / (state='o', initialValue='task aspect');
    public list components / (sendEvent='N');
    public list baselineIdentification / (sendEvent='N');
    public list focusInformation / (sendEvent='N');
    public list inclusionInstances / (sendEvent='N');
    public list repositoryInstances / (sendEvent='N');
    loadFocus: method datagram:list;
        dcl num rc=insertl(focusInformation, copylist(datagram), -1);
    endmethod;
endclass;
```

| -continued |
| --- |
| OPERATION A-1: |

```
    public list baselineIdentification /
        (initialValue={'demo.repository301.christmasbonus'});
    setBaseline: method;
        dcl object thisProgram=getnitemo(components, 'task aspect');
        thisProgram.loadBaseline(baselineIdentification);
    endmethod;
endclass;
class taskAspect;
    public char name / (state='o', initialValue='task aspect');
    public list components / (sendEvent='N');
    public list baselineIdentification / (sendEvent='"N');
    public list focusInformation / (sendEvent='N');
    public list inclusionInstances / (sendEvent='N');
    public list repositoryInstances / (sendEvent='N');
        loadBaseline: method datagram:list;
            copylist(datagram, 'N', baselineIdentification);
        endmethod;
endclass;
```

In operation A-2, as set forth in the exemplary code below, the Task Aspect receives a datagram that includes information that identifies the union trigger name as well as the order-of-operations for the execution cycle in relation to the union focus property. The order of operations can be specified as preprocess or postprocess. The union focus property may also identify a specific property, referred to as the union initiation point, within the union baseline instances. Example behaviors that can be created by union of concerns, as specified by focus properties, include branching the standard execution cycle into other repository programs, accomplished by, pre-process and postprocess deviations as pictured in FIG. 2. Optionally a preprocess or postprocess deviation can be supplemented by disabling or enabling method properties within the union baseline, as needed.

In operation A-3, as set forth in the exemplary code below, the Task Aspect receives a datagram comprising program object identifiers that are referred to as the union inclusion of a union operation. The union inclusion of a union operation may contain receptor directives that are matched, by union trigger name, to information associated to the union initiation point.

| OPERATION A-3: |
| --- |

```
class taskManager;
    public list components / (sendEvent='N');
    public list inclusionInstances / (sendEvent='N');
    setInclusion: method;
        dcl object thisProgram=getnitemo(components, 'task aspect');
        thisProgram.loadInclusion(inclusionInstances);
    endmethod;
endclass;
class taskAspect;
    public char name / (state='o', initialValue='task aspect');
    public list components / (sendEvent='N');
    public list baselineIdentification / (sendEvent='N');
    public list focusInformation / (sendEvent='N');
    public list inclusionInstances / (sendEvent='N');
    public list repositoryInstances / (sendEvent='N');
    loadInclusion: method datagram:list;
        copylist(datagram, 'N', inclusionInstances);
    endmethod;
endclass;
```

In operation A-4, as set forth in the exemplary code below, the Task Aspect receives a datagram that includes program object identifiers that are referred to as repository instances. Repository instances comprise the standard programs and processes of an application. Specified repository instances are used in coordination with union baseline information, and when used together, identify two distinct categories of instances that are subject to union operations.

---

OPERATION A-4:

```
class taskManager;
    public list components / (sendEvent='N');
    public list inclusionInstances / (sendEvent='N');
    setInstances: method;
        dcl object thisProgram=getnitemo(components, 'assembly
           routine');
        thisProgram.runInterface('REPOSITORY399',
           inclusionInstances);
    endmethod;
    setRepository: method;
        dcl object thisProgram=getnitemo(components, 'task aspect');
        thisProgram.loadRepository(inclusionInstances);
```

-continued

OPERATION A-4:

```
    endmethod;
endclass;
class taskAspect;
    public char name / (state='o', initialValue='task aspect');
    public list components / (sendEvent='N');
    public list baselineIdentification / (sendEvent='N');
    public list focusInformation / (sendEvent='N');
    public list inclusionInstances / (sendEvent='N');
    public list repositoryInstances / (sendEvent='N');
    loadRepository: method datagram:list;
        copylist(datagram, 'N', repositoryInstances);
    endmethod;
endclass;
```

In operation A-5, as set forth in the exemplary code below, the Task Aspect receives a repository collective of object identifiers (e.g., the object identifiers of inclusion instances) upon which an operation is performed to identify union receptors. The Task Aspect iterates through each object, examining event handler properties for event handlers that exist in a disabled state, extracting a full set of parameter information from each event handler.

---

OPERATION A-5:

```
class taskAspect;
    public char name / (state='o', initialValue='task aspect');
    public list components / (sendEvent='N');
    public list baselineIdentification / (sendEvent='N');
    public list focusInformation / (sendEvent='N');
    public list inclusionInstances / (sendEvent='N');
    public list repositoryInstances / (sendEvent='N');
    public list receptorID / (sendEvent='N');
    public list receptorEvent / (sendEvent='N');
    public list receptorMethod / (sendEvent='N');
    runReceptorDirectives: method;
        dcl num xDirective rc xComponent activeStatus;
        dcl object thisProgram;
        dcl list thisDirective;
        do xComponent = 1 to listlen(inclusionInstances);
            dcl list directive= { };
            thisProgram=getitemo(inclusionInstances, xComponent);
            thisProgram._getEventHandlers(directive, 'Y');
            do xDirective = 1 to listlen(directive);
                thisDirective=getiteml(directive, xDirective);
                activeStatus=1;
                if nameditem(thisDirective, 'state')=0 then activeStatus=0;
                if nameditem(thisDirective, 'sender')=0 then activeStatus=0;
                if itemtype(thisDirective, nameditem(thisDirective, 'sender')) NE 'C' then
                    activeStatus=0;
                if getnitemc(thisDirective, 'sender') NE '*' then activeStatus=0;
                if activeStatus then do;
                    rc=inserto(receptorID, thisProgram, -1);
                    rc=insertc(receptorEvent, getnitemc(thisDirective, 'event'), -1);
                    rc=insertc(receptorMethod, getnitemc(thisDirective, 'method'), -1);
                end;
            end;
            rc=dellist(directive, 'Y');
        end;
    endmethod;
endclass;
```

In operation A-6, as set forth in the exemplary code below, the Task Aspect iterates though instances received in operation 4, removing instances that do not match information received in operation A-1. A union-transmitter is implemented in each instance using information received in operation A-2.

OPERATION A-6:

```
class taskAspect;
    public char name / (state='o', initialValue='task aspect');
    public list components / (sendEvent='N');
    public list baselineIdentification / (sendEvent='N');
    public list focusInformation / (sendEvent='N');
    public list inclusionInstances / (sendEvent='N');
    public list repositoryInstances / (sendEvent='N');
    public list receptorID / (sendEvent='N');
    public list receptorEvent / (sendEvent='N');
    public list receptorMethod / (sendEvent='N');
    public list transmitterMethods / (initialValue={
                    'unionOnly',
                    'createTransmitter'
                    });
    runUnionTransmiter: method;
        dcl num i;
        do i=1 to listlen(transmitterMethods);
            call send(_self_, getitemc(transmitterMethods, i));
        end;
    endmethod;
    unionOnly: method / (description='remove instances not subject to union-transmitter
        implementation');
        dcl num xComponent;
        dcl object thisProgram;
        do xComponent=listlen(repositoryInstances) to 1 by -1;
            thisProgram=getitemo(repositoryInstances, xComponent);
            if thisProgram.description NE getitemc(baselineIdentification) then
                delitem(repositoryInstances, xComponent);
        end;
    endmethod;
    createTransmitter: method / (description='create union transmitter as specified');
        dcl num rc xComponent xUnion;
        dcl char thisProperty thisSequence thisTransmitter;
        dcl object thisProgram;
        dcl list metadata={ };
        do xComponent=1 to listlen(repository Instances);
            do xUnion=1 to listlen(unionInformation);
                thisProperty =getnitemc(unionInformation, 'union focus property');
                thisSequence =getnitemc(unionInformation, 'union focus sequence'):
                thisTransmitter=getnitemc(unionInformation, 'union focus transmitter');
                if thisSequence='Before' then rc=insertc(metadata, 'B', -1, 'execute');
                if thisSequence='After' then rc=insertc(metadata, 'A', -1, 'execute');
                rc=insertc(metadata, thisTransmitter, -1, 'name');
                rc=insertc(metadata, thisProperty, -1, 'method');
                rc=insertc(metadata, 'Y', -1, 'enabled');
                thisProgram=getitemo(repositoryInstances, xComponent);
                thisProgram._addEvent(metadata);
                rc=dellist(metadata);
            end;
        end;
    endmethod;
endclass;
```

In operation A-7, as set forth in the exemplary code below, the Task Aspect iterates though instances identified as union inclusions in operation A-3. The union receptor name for each iteration is obtained and used for searching a list of union transmitter names (e.g., operations A-2 and/or A-6). For each iteration where a match between union-receptor name and union-transmitter name is verified, the Task Aspect creates and enables one union-receptor constrained to one union-transmitter identified during the transmitter name search.

OPERATION A-7:

```
class taskAspect;
    public char name / (state='o', initialValue='task aspect');
    public list components / (sendEvent='N');
    public list baselineIdentification / (sendEvent='N');
    public list focusInformation / (sendEvent='N'); public list inclusionInstances /
        (sendEvent='N'); public list repositoryInstances / (sendEvent='N'); public list receptorID /
        (sendEvent='N'); public list receptorEvent / (sendEvent='N'); public list receptorMethod /
        (sendEvent='N');
    runUnionReceptor: method / (description='create a union-receptor constrained to a single
        transmitting instance');
        dcl num xTransmitter xComponent;
        dcl char thisreceptorMethod thisReceptorEvent;
        dcl object thisTransmitterID thisreceptorID thisProgram;
        do xComponent=1 to listlen(receptorID);
            xTransmitter =searchc(transmitterEvent, getitemc(receptorEvent, xComponent));
            thisTransmitterID =getitemo(transmitterID, xTransmitter);
            thisReceptorID =getitemo(receptorID, xComponent);
            thisReceptorMethod=getitemc(receptorMethod, xComponent);
            thisReceptorEvent =getitemc(receptorEvent, xComponent);
            thisProgram=getitemo(receptorID, xComponent);
            thisProgram._addEventHandler(thisTransmitterID, thisReceptorEvent,
            thisReceptorMethod);
        end;
    endmethod;
endclass;
```

Figure 3:
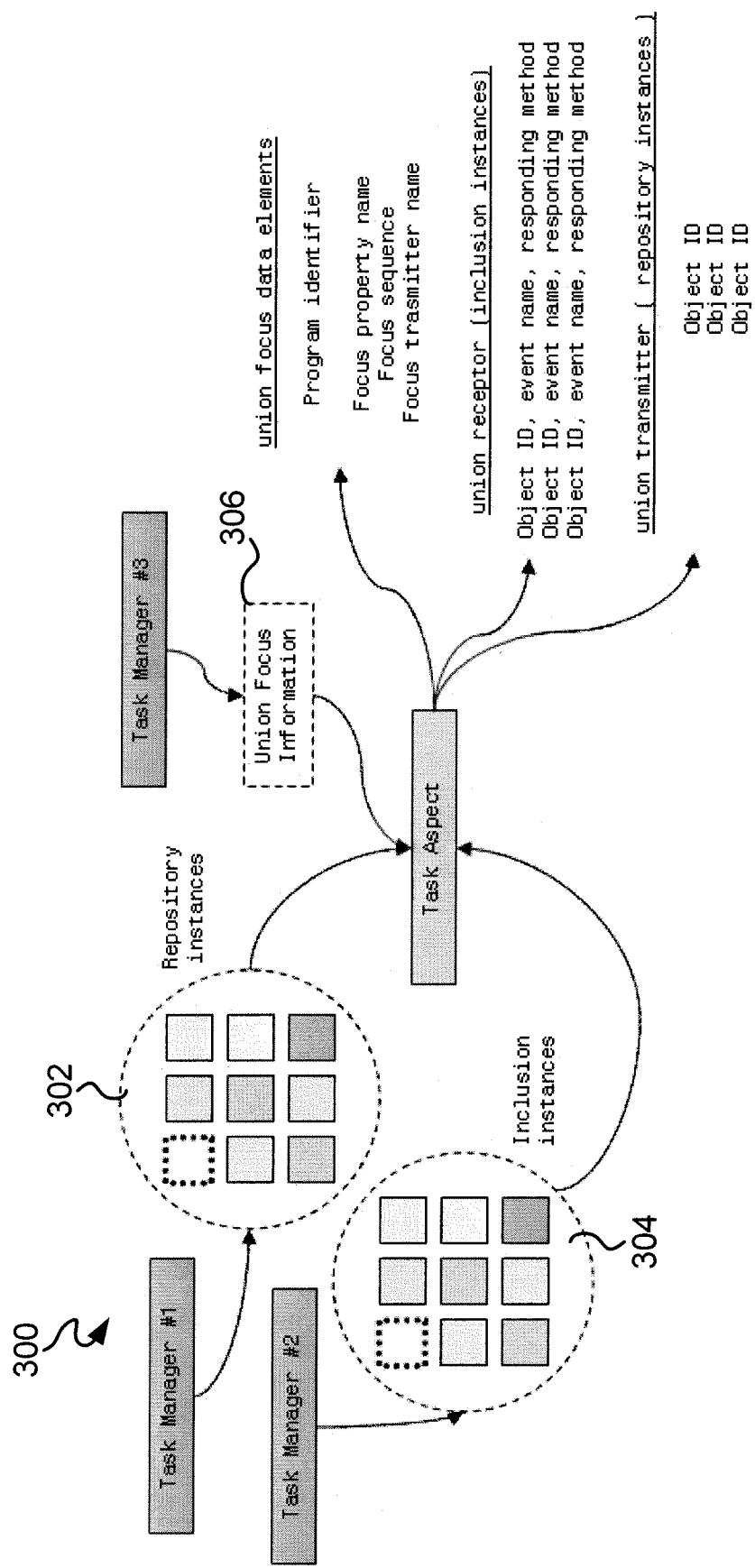
FIG. 3 is a process flow diagram depicting the process flow of operations A-1 through A-4 of the union of concerns and the conceptual information retained by the aspect and that is used in operations A-5 through A-7 of the union of concerns.

FIG. 3 is a process flow diagram depicting the process flow 300 of operations A-1 through A-4. In particular, FIG. 3 shows the reception of two categories of program object identifiers 302, 304 (repository and inclusions) as well as the reception of focus information 306 (shown as a single reception). FIG. 3 also depicts the conceptual information retained by the aspect and that is used in operations A-5 through A-7.

Figure 4:
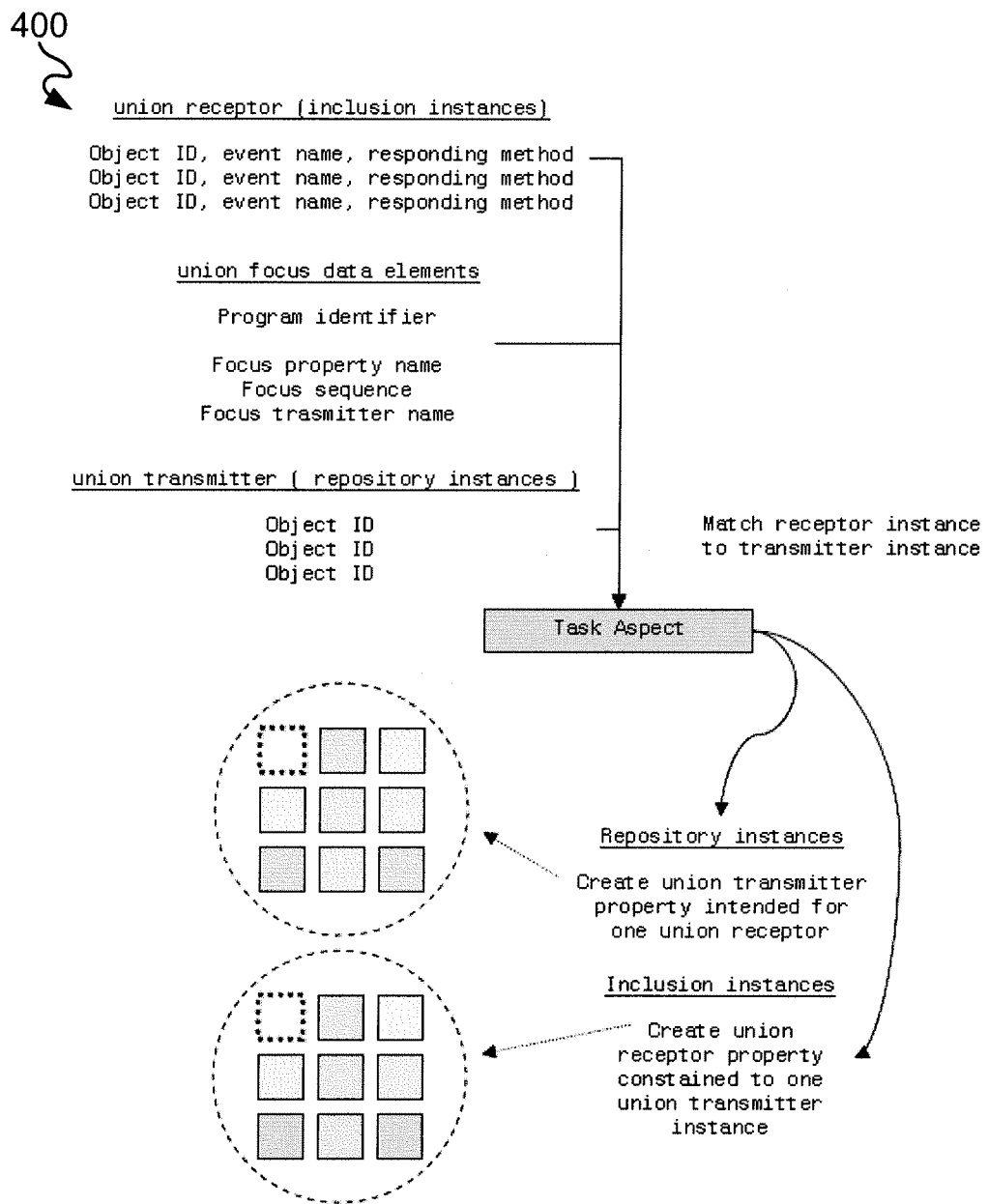
FIG. 4, is a process flow diagram depicting the process flow of the outflow of information from a task aspect using information obtained from the process flow set forth in FIG. 3.

FIG. 4, is a process flow diagram depicting the process flow 400 of the outflow of information from a task aspect using information obtained from the process flow 300 set forth in FIG. 3. One objective of the portion of the process shown in FIG. 4 is to create new transmission properties in the repositories that link to new properties in the inclusion instances.

The union of concerns approach can be used to remove the need for invasive programming on legacy code, allowing the original source code to remain in the system without any modification, while providing secondary programs an entry point to become a "program layer" at runtime. Optionally, the union of concerns approach can be modified to create constrained assembly lines of programs for parallel processing constrained to a single Task Manager program.

In accordance with one embodiment, the union of concerns may involve methods for identifying of a repository program on which to perform a union-relationship and identifying a specific point in a repository program where a union-relationship can be implemented. The union of concerns may also include logic for creating a union-relationship transmission point and/or reception point in one or more of the repository programs.

Integration of Concerns

In order to implement the union of concerns, it may be useful to carry out an integration of concerns to avoid problems arising from parent-child relations between programs, and can become very important when integrating visual component programs, referred to as a graphical user interface, with backend server programs. The integration of concerns is intended to eliminate parent-child relationships between programs in the application while removing the concept of hierarchical program design at the same time. This approach uses specified attributes in one category of program repository as common property, or globally accessible, to be accessed as-needed by programs in other repository categories.

In an embodiment, the content of each repository program is scanned for properties that are designated for integration operations across objects, which includes the identification of source property locations and target property locations. The name of a program collective (which may be assigned according to a generally accepted logic categorization chart) is information that can be used to determine the identity of programs that are source property containers or programs that are target property containers.

The object identifier and descriptive information of properties used to create an integration of concerns can be obtained from all repository programs and stored.

In one embodiment, the object identifier of each repository program may be scanned, resulting in a list of information for use in the integration of concerns operation. This list may contain the object identifier of a repository program matched with the object identifier of a program property that has been identified as source property. In another embodiment, the resulting list of information may contain the object identifier of a repository program matched with the object identifier of a program property that has been identified as target property.

In one embodiment, a Task Aspect program can iterate sequentially through the list of target properties to search the list of source properties for a single match. Although property names are used in the examples set forth herein, the match criteria can be based on property name or descriptive information elements associated directly to each property. Upon locating a matching source and target property (based on the match criteria), the Task Aspect program can then assign the source property object identifier to the target property.

A relationship is created between repository programs through attributes that are designated as multiple ownership properties, which replace the need to match parameter signatures located in invoking programs with parameter signatures in a receptor programs. Multiple ownership properties create a static pathway for information traversals between calling and receiving programs. This approach removes the need for most hard coded parameters, thereby removing the need to track parameter reception by typecast and sequence.

The integration relationship can be created dynamically, which allows legacy programs to be easily integrated with newly developed programs, as the program assembly routine and integration routine create no differentiation between legacy modules and new modules. This way, one may add functionality, features, or swap entire program repositories, without coding alterations to the existing code base. Optionally, by using integrated concerns comprising of one or more program object-identifiers instead of attribute object-identifiers, the functionality of visual components and non-visual components can exist as a single layer, enhancing the ability to categorically separate concerns.

Further description of the various aspects of an integration of concerns will be described using the following exemplary operations B-1 through B-7 and with the further assistance FIGS. 5 and 6.

In operation B-1, as set forth in the exemplary code below, the Task Aspect receives three containers filled with program object-identifiers, categorized by a datagram. The datagram indicates the category of program according to a generally accepted logic categorization chart, processing the datagram. The Task Aspect copies inbound program object-identifiers into the specified storage location. One datagram indicates the storage location is designated to hold instances categorized as common workspace, referred to as "repository000" series. One datagram indicates whether the storage location is designated to hold instances categorized as targets, which may be any repository other than "repository000" series. One datagram indicates whether the storage location is designated to hold instances categorized as beans, which may be custom named as needed. Optionally, this storage location may contain instances without regard for repository categorizations.

Operation B-1:

```
class taskAspect;
    public char name / (state='o', initialValue='task aspect');
    public list components / (sendEvent='N');
    public list transport / (sendEvent='N');
    public list sourceRepository / (sendEvent='N');
    public list targetRepository / (sendEvent='N');
    public list repositoryInstances / (sendEvent='N');
    public list beanBag / (sendEvent='N');
    public list focusIdentification / (sendEvent='N');
    public list unionInformation / (sendEvent='N');
    eventhandler loadSourceRepository / (sender='*',
        event='source repository');
    eventhandler loadTargetRepository / (sender='*',
        event='target repository');
    eventhandler loadBeanBag / (sender='*', event='bean bag');
    loadSourceRepository: method container:list;
        copylist(container, 'N', sourceRepository);
        copylist(container, 'N', repositoryInstances);
    endmethod;
    loadTargetRepository: method container:list;
        copylist(container, 'N', targetRepository);
        copylist(container, 'N', repositoryInstances);
    endmethod;
    loadBeanBag: method container:list;
        copylist(container, 'N', beanBag);
    endmethod;
endclass;
```

Figure 5:
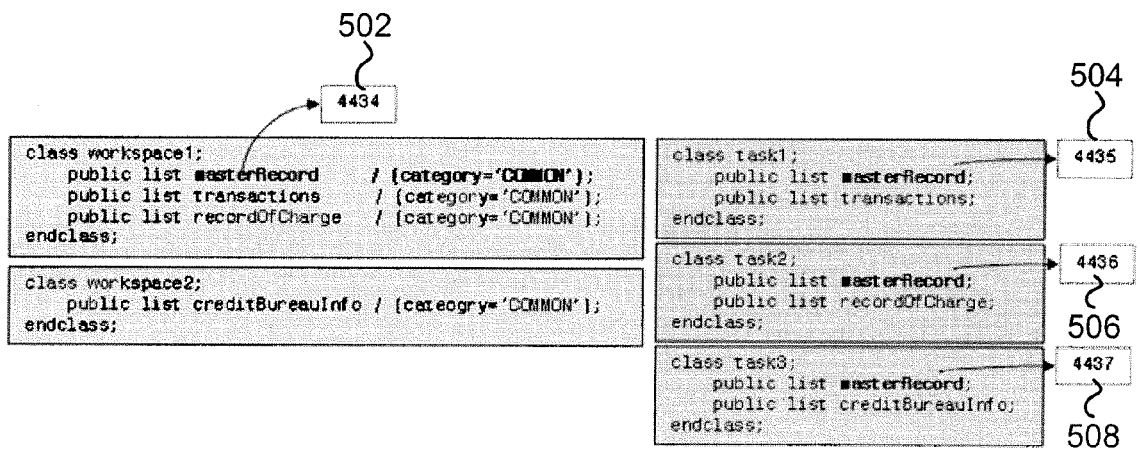
FIG. 5 is a conceptual diagram showing the object identifier numbers for an attribute named "masterRecord"

FIG. 5 is a conceptual diagram showing the object identifier numbers 502, 504, 506, 508 for an attribute named "masterRecord," which appears in four out of five instances. The attribute masterRecord in each program has a unique identifier pointing to a unique location in memory.

In operation B-2, as set forth in the exemplary code below, the Task Aspect iterates through the listing of objects originating within a common workspace repository, creating a listing of information containing program object-identifier, property object-identifier, and the name of the property. One group of information is created for each data element in each instance identified as a property source when creating a mutual ownership relationship. Each data element within the group of information gained from the iteration operation is stored in separate container. This operation may be restricted to attributes declared as "PUBLIC" and typecast as "LIST." Optionally, restrictions can restrict the identification process of source attributes. This program may restrict processing to attributes with specific descriptive information. Source code instances are depicted in FIG. 5 as "workspace1" and "workspace2."

OPERATION B-2:

```
class taskAspect;
    public char name / (state='o', initialValue='task aspect');
    public list components / (sendEvent='N');
    public list transport / (sendEvent='N');
    public list sourceRepository / (sendEvent='N');
    public list targetRepository / (sendEvent='N');
    public list repositoryInstances / (sendEvent='N');
    public list beanBag / (sendEvent='N');
    public list focusIdentification / (sendEvent='N');
    public list unionInformation / (sendEvent='N');
    public list sourceCategory / (sendEvent='N');
    public list sourceInstance / (sendEvent='N');
    public list sourceAttribute / (sendEvent='N');
    public list targetCategory / (sendEvent='N');
```

-continued

OPERATION B-2:

```
    public list targetInstance / (sendEvent='N');
    public list targetAttribute / (sendEvent='N');
    _init: method / (state='o');
        _super( );
        dcl num rc;
        rc=insertl(transport, sourceCategory, -1, 'sourceCategory');
        rc=insertl(transport, sourceInstance, -1, 'sourceInstance');
        rc=insertl(transport, sourceAttribute, -1, 'sourceAttribute');
        rc=insertl(transport, targetCategory, -1, 'targetCategory');
        rc=insertl(transport, targetInstance, -1, 'targetInstance');
        rc=insertl(transport, targetAttribute, -1, 'targetAttribute');
        rc=insertl(transport, sourceRepository, -1, 'sourceRepository');
        rc=insertl(transport, targetRepository, -1, 'targetrepository');
        rc=insertl(transport, beanBag, -1, 'beanBag');
    endmethod;
    identifySourceProperty: method;
        dcl object thisProgram=getnitemo(components, 'source property');
        thisProgram.runInterface(transport);
    endmethod;
endclass;
class sourceProperty;
    public char name / (state='o', initialValue='source property');
    runInterface: method transport:list;
        dcl object thisProgram;
        dcl num xAttribute rc xComponent;
        dcl list thisAttribute={ };
        dcl list repositoryInstances=getniteml(transport, 'sourceRepository');
        dcl list sourceCategory =getniteml(transport, 'sourceCategory');
        dcl list sourceInstance =getniteml(transport, 'sourceInstance');
        dcl list sourceAttribute =getniteml(transport, 'sourceAttribute');
        do xComponent = 1 to listlen(repositoryInstances);
            dcl list componentAttribute={ };
            thisProgram=getitemo(repositoryInstances, xComponent);
            thisProgram._getAttributes(componentAttribute, 'Y');
            do xAttribute = 1 to listlen(componentAttribute);
                thisAttribute=getiteml(componentAttribute, xAttribute);
                if nameditem(thisAttribute, 'category') then do;
                    if upcase(getnitemc(thisAttribute,'type'))='LIST' and
                        upcase(getnitemc(thisAttribute,'category')) in ('COMMON') and
                        upcase(getnitemc(thisAttribute,'scope'))='PUBLIC' then do;
                        rc=insertc(sourceCategory, upcase(getnitemc(thisAttribute,'category')),
                            -1, thisProgram.description);
                        rc=insertc(sourceAttribute, getnitemc(thisAttribute, 'name'), -1,
                            thisProgram.description);
                        rc=inserto(sourceInstance, thisProgram, -1, thisProgram.description);
                    end;
                end;
            end;
            rc=dellist(componentAttribute, 'Y');
        end;
        rc=dellist(thisAttribute);
    endmethod;
endclass;
```

In operation B-3, as set forth in the exemplary code below, the Task Aspect iterates through the listing of objects originating within any repository except a common workspace repository, creating an information group comprising of program object-identifier, property object-identifier, and the name of the property. One group of information is created for each data element in each instance identified as a property target when creating a mutual ownership relationship. Each data element within the group of information gained from the iteration operation is stored in separate container. This operation is restricted to attributes declared as "PUBLIC" and typecast as "LIST." Optionally, additional restrictions can restrict the identification process to specific attributes, or attributes with a matching source property entry. This program restricts processing to attributes with a blank category descriptor. Target instances are depicted in FIG. 5 as "task1," "task2," and "task3."

OPERATION B-3:

```
class taskAspect;
    public char name / (state='o', initialValue='task aspect');
    public list components / (sendEvent='N');
* cut;
        identifyTargetProperty: method;
            dcl object thisProgram=getnitemo(components, 'target property');
```

-continued

OPERATION B-3:

```
        thisProgram.runInterface(transport);
    endmethod;
endclass;
class targetProperty;
    public char name / (state='o', initialValue='target property');
    runInterface: method transport:list;
        dcl num xAttribute xComponent rc;
        dcl object thisProgram;
        dcl list repositoryInstances=getniteml(transport, 'targetRepository');
        dcl list targetAttribute =getniteml(transport, 'targetAttribute');
        dcl list targetCategory =getniteml(transport, 'targetCategory');
        dcl list targetInstance =getniteml(transport, 'targetInstance');
        do xComponent = 1 to listlen(repositoryInstances);
            dcl list componentAttribute={ };
            dcl list thisAttribute={ };
            thisProgram=getitemo(repositoryInstances, xComponent);
            thisProgram._getAttributes(componentAttribute, 'Y');
            do xAttribute = 1 to listlen(componentAttribute);
                thisAttribute=getiteml(componentAttribute, xAttribute);
                if nameditem(thisAttribute, 'category') then do;
                    if upcase(getnitemc(thisAttribute,'type'))='LIST' and
                        upcase(getnitemc(thisAttribute,'category')) in ('') and
                        upcase(getnitemc(thisAttribute,'scope'))='PUBLIC' then do;
                        rc=insertc(targetCategory, upcase(getnitemc(thisAttribute, 'category')),
                            −1, thisProgram.description);
                        rc=insertc(targetAttribute, getnitemc(thisAttribute, 'name'), −1,
                            thisProgram.description);
                        rc=inserto(targetInstance, thisProgram, −1, thisProgram.description);
                    end;
                end;
                rc=clearlist(thisAttribute);
            end;
            rc=dellist(thisAttribute, 'Y');
            rc=dellist(componentAttribute, 'Y');
        end;
    endmethod;
endclass;
```

In operation B-4, as set forth in the exemplary code below, the Task Aspect iterates sequentially through a list of properties identified as target property names, involved in a mutual relationship, as defined by the process in operation B-3. This program searches the list of source property names for a matching entry. When a matching entry is found, the attribute object-identifier of the source property is assigned to the target property, within the corresponding target instance.

OPERATION B-4:

```
class taskAspect;
    public char name / (state='o', initialValue='task aspect');
    public list components / (sendEvent='N');
    * cut ;
    integration: method;
        dcl object thisProgram=getnitemo(components, 'integration');
        thisProgram.runInterface(transport);
    endmethod;
endclass;
class integrationAssignments;
    public char name / (state='o', initialValue='integration');
    runInterface: method transport:list;
        dcl num xTarget xSource;
        dcl char targetName;
        dcl list sourceID targetID;
        dcl object thisSource thisTarget;
        dcl list sourceCategory =getniteml(transport,
            'sourceCategory');
        dcl list targetCategory =getniteml(transport,
            'targetCategory');
        dcl list sourceAttribute=getniteml(transport,
            'sourceAttribute');
```

-continued

OPERATION B-4:

```
        dcl list targetAttribute=getniteml(transport,
            'targetAttribute');
        dcl list sourceInstance =getniteml(transport,
            'sourceInstance');
        dcl list targetInstance =getniteml(transport,
            'targetInstance');
        do xTarget=1 to listlen(targetAttribute);
            targetName=getitemc(targetAttribute, xTarget);
            thisTarget=getitemo(targetInstance, xTarget);
            xSource=searchc(sourceAttribute, targetName);
            if xSource > 0 then do;
                thisSource=getitemo(sourceInstance, xSource);
                sourceID=thisSource._getAttributeValue(targetName);
                targetID=thisTarget._getAttributeValue(targetName);
                if getitemc(sourceCategory, xSource)='COMMON'
                then do;
                    thisTarget._setAttributeValue(targetName,
                        sourceID);
                end;
            end;
        end;
    endmethod;
endclass;
```

Figure 6:
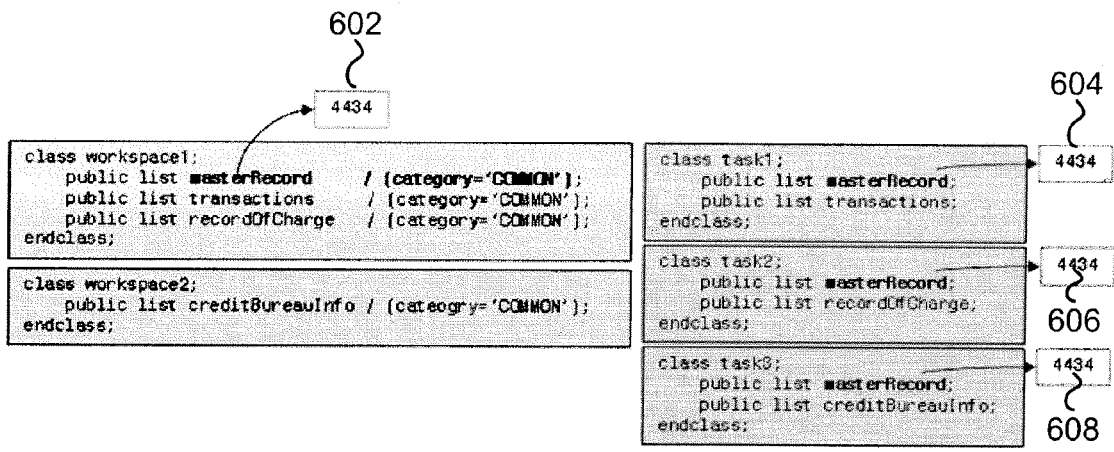
FIG. 6 is a conceptual diagram showing the object-identifier the source property named "masterRecord" assigned to programs with a matching target property name with the attribute "masterRecord" sharing the same storage location in memory.

FIG. 6 is a conceptual diagram showing the object-identifier 602, 604, 606, 608 of the source property named "masterRecord" assigned to programs with a matching target property name. The attribute "masterRecord" in four programs share the same storage location in memory.

The integration operation joins, or links, attributes across instances. In theory, if it possible to use SQL to perform the operation called integration of concerns, we would expect to see the following exemplary code set forth in operation B-5.

---
OPERATION B-5:
---
```
proc SQL-Magic;
    push objectIdentifiers
    located in sourceInstances workspace1, workspace2
    into targetInstances task1, task2, task2
    where attributeName in sourceInstances = attributeName in
    targetInstances;
quit;
```
---

In operation B-6, as set forth in the exemplary code below, this program obtains a list of program object-identifiers identified by the Task Aspect in operation B-1 as repository beans ("repositoryBeans"). This program then iterates sequentially over each instance, without regard to repository category, and obtains a listing of attributes within each instance. This program searches the listing of instance attributes for an attribute named "BEANS." When an attribute named "BEANS" is located, the program object-identifiers identified as beans are copied into the attribute named beans within that instance.

---
OPERATION B-6:
---
```
class taskAspect;
    public char name / (state='o',
    initialValue='task aspect');
    public list components / (sendEvent='N');
    public list transport / (sendEvent='N');
    * cut ;
    beanPool: method;
        dcl object thisProgram=getnitemo(components,
        'bean pool');
        thisProgram.runInterface(transport);
    endmethod;
endclass;
class beanPool;
    public char name / (state='o',
    initialValue='bean pool');
    runInterface: method transport:list;
        dcl object thisProgram;
        dcl num rc xComponent;
        dcl list repositoryInstances=gemiteml(transport,
        'repositoryInstances');
        dcl list beanBag =getniteml(transport, 'beanRepository');
        do xComponent = 1 to listlen(repositoryInstances);
            dcl list componentAttribute={ };
            thisProgram=getitemo(repositoryInstances, xComponent);
            thisProgram._getAttributes(componentAttribute, 'Y');
            if nameditem(componentAttribute, 'beans') then
                copylist(beanBag, 'N', thisProgram.beans);
            rc=dellist(componentAttribute, 'Y');
        end;
    endmethod;
endclass;
```
---

In operation B-7, the concept of a bean pool is extended, using event directives to accomplish the integration of concerns operation. This operation can be performed optionally, or in conjunction with the standard integration of concerns. While this operation is resource intensive, it may be beneficial when used to connect visual elements and non-visual elements in an application, effectively networking programs that exist in two separate layers. First, a calling program in the application issues an event coupled with a parameter declared as a "LIST." Programs coded with a responding eventhandler insert their own program object identifier into the LIST parameter. This results with the LIST property in calling program being loaded with program object identifiers, which may be provided by visual widgets as well as non visual programs.

---
OPERATION B-7:
---
```
class pushbutton1 extends sashelp.classes.pushbutton_c.class;
    eventhandler network / (sender='*', event='bean pool');
    network: method arg:list;
        dcl num rc=inserto(arg, _self_, -1);
    endmethod;
    * more statements ;
endclass;
class combobox1 extends sashelp.classes.combobox_c.class;
    eventhandler network / (sender='*', event='bean pool');
    network: method arg:list;
        dcl num rc=inserto(arg, _self_, -1); endmethod; *
        more statements ;
endclass;
class task;
    public list beans / (sendEvent='N');
    public list messages / (sendEvenr='N');
        getBeans: method; _sendEvent('bean pool', beans);
    endmethod;
    runInterface: method;
        dcl num i;
        dcl object thisProgram;
        do i=1 to listlen(beans) while (listlen(messages)=0);
            thisProgram.getitemo(beans, i);
            thisProgram.behavior1( );
        end;
    endmethod;
endclass;
```
---

In accordance with one embodiment, the integration of concerns may involve a method for designating a program property to be used as property-in-common across objects created from a plurality of repository collectives as well as a method for identifying a program property location as the receptor for a common property identifier. The integration of concerns may also involve for creating a listing of information. The listing of information may comprise: (1) source property identifiers with associated program identifier(s); (2) target property identifiers with associated program identifier(s); (3) union-relationship transmission triggers with associated program identifier(s); and/or (4) union-relationship reception points with associated program identifier(s). The integration of concerns may further involve logic for altering a target-program property by assigning a source property object-identifier to its designated target property.

Assembly of Concerns

Figure 7:
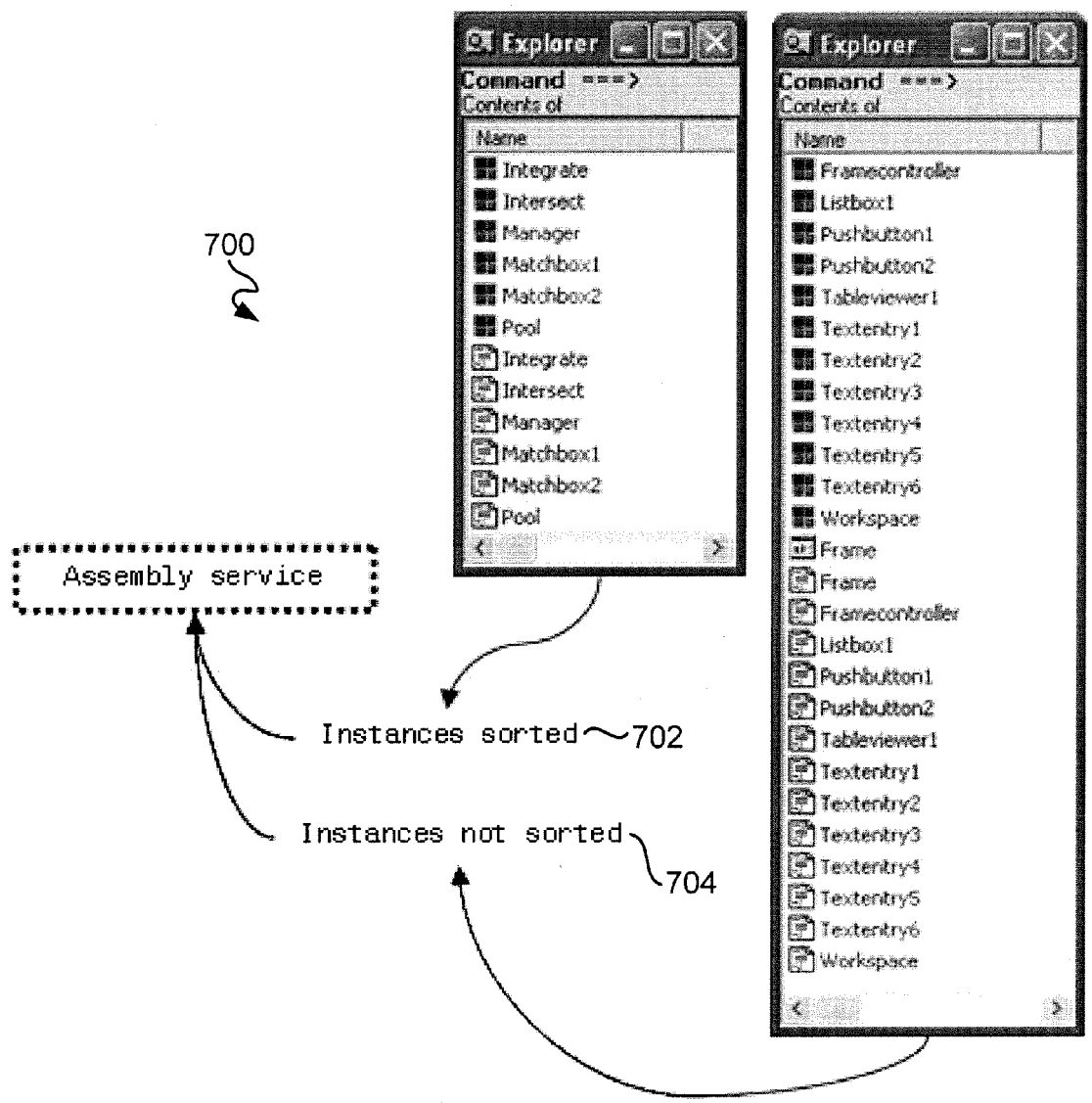
FIG. 7 is a conceptual representation of an assembly of concerns process.

FIG. 7 is a conceptual representation of an assembly of concerns process 700. In FIG. 7, the extraction of instances is depicted using physical programs from two repositories: one where the repository instances are sorted 702 and the other where the repository instances are not sorted 704. Program object identifiers obtained through assembly of concerns are categorized in storage locations for the Task Aspect program, where the storage locations indicate the separation of union transmitter and union receptor concerns, for use in union of concerns implementations.

The assembly process for repository programs includes the acquisition of data that specifies the physical location of a repository collective, the acquisition of repository program names, and class instantiation, and program sequencing. The assembly routine obtains a listing of class names in the container, performs an instantiation operation on each class, resulting in the creation of an instance. This approach removes hard-coded program names from the source code. Optionally, the ability to implement controls governing the execution-sequencing of individual programs as a separate concern allows the dynamic selection of repository collectives, which in traditional programming occurs during the initial application startup phase, and may also occur as needed during the course of the application.

In accordance with an embodiment of an assembly of concerns process, collective programs in a specified repository are located. For each collective, the respective object identifier(s) is created and stored for the duration of the application. The programs of repositories designated as source containers may be located and instantiated so that the object identifiers can be collected into one or more specified containers. In on embodiment, the programs of repositories designated as target containers can be located and instantiated so that the object identifiers are collected into one or more specified target containers.

Operation C-1 sets forth exemplary code for an assembly process in accordance with an illustrative embodiment.

```
OPERATION C-1:

class assembly;
    public char name / (state='o', initialValue='assembly routine');
    public num sequenceFlag / (sendEvent='N', initialValue=0);
    public char libraryName / (sendEvent='N');
    public list repositoryNames / (sendEvent='N');
    public list rawVector / (sendEvent='N');
    public list repositoryVector / (sendEvent='N');
    public list processedVector / (sendEvent='N');
    public list messages / (sendEvent='N');
    public list activeMethods / (initialValue={
                                                'step1',
                                                'step2',
                                                'step3',
                                                'step4',
                                                'step5',
                                                'step6',
                                                'step7'
                                              });
    runInterface: method repositoryContainer:list instanceContainer:list;
        dcl num xMethod xItem;
        copylist(repositoryContainer, 'N', repositoryNames);
        do xItem=1 to listlen(repositoryNames);
            do xMethod=1 to listlen(activeMethods) while (listlen(messages)=0);
                call send(__self__, getitemc(activeMethods, xMethod));
            end;
            call send(__self__, 'iterationCleanup');
        end;
        copylist(processedVector, 'N', instanceContainer);
        call send(__self__, 'cycleCleanup');
    endmethod;
    step1: method;
        dcl char thisRepository=upcase(popc(repositoryNames));
        dcl num rc;
        submit continue sql;
        create table work.temp as
            select * from sashelp.vcatalg
            where   libname='&libraryName' and
                    memname='&thisRepository' and
                    objtype='CLASS';
            quit;
        endsubmit;
        if symgetn('sqlrc') then
            rc=insertc(messages, 'zero class structures in catalog', -1);
    endmethod;
    step2: method;
        dcl num rc dset;
        dcl char arg1 arg2 arg3 arg4;
        dset=open('work.temp', 'i');
        do while (fetch(dset)=0);
            arg1=getvarc(dset, varnum(dset, 'libname'));
            arg2=getvarc(dset, varnum(dset, 'memname'));
            arg3=getvarc(dset, varnum(dset, 'objname'));
            arg4=getvarc(dset, varnum(dset, 'objtype'));
                rc=insertc(rawVector, compress(arg1||'.'||arg2||'.'||arg3||'.'||arg4), -1);
        end;
        rc=close(dset);
        rc=delete('work.temp');
    endmethod;
    step3: method;
        dcl num xProgram rc;
        dcl object thisProgram;
        do xProgram=1 to listlen(rawVector);
            thisProgram=instance(loadclass(getitemc(rawVector, xProgram)));
            rc=inserto(repositoryVector, thisProgram, -1);
        end;
```

-continued

OPERATION C-1:

```
        endmethod;
        step4: method;
            dcl num i rc;
            dcl object thisProgram;
            dcl list componentAttribute={ };
            do i=1 to listlen(repositoryVector);
                thisProgram=getitemo(repositoryVector, i);
                thisProgram.__getAttributes(componentAttribute, 'Y');
                if nameditem(componentAttribute, 'sequence__id') then do;
                    sequenceFlag+1;
                    nameitem(repositoryVector, i, thisProgram.sequence__id);
                end;
                rc=clearlist(componentAttribute, 'D');
            end;
        endmethod;
        step5: method;
            dcl num rc;
            if sequenceFlag=listlen(repositoryVector) then
                rc=sortlist(repositoryVector, 'name');
        endmethod;
        step6: method;
            dcl num xProgram;
            dcl object thisProgram;
            do xProgram=1 to listlen(repositoryVector);
                thisProgram=getitemo(repositoryVector, xProgram);
                nameitem(repositoryVector, xProgram, thisProgram.name);
            end;
        endmethod;
        step7: method;
            copylist(repositoryVector, 'N', processedVector);
        endmethod;
        iterationCleanup: method;
            dcl num rc;
            rc=clearlist(messages);
            rc=clearlist(rawVector);
            rc=clearlist(repositoryVector);
            sequenceFlag=0;
        endmethod;
        cycleCleanup: method;
            dcl num rc;
            rc=clearlist(repositoryNames);
            rc=clearlist(processedVector);
        endmethod;
endclass;
```

At "step1" in operation C-1, the assembly routine receives a datagram which is information that indicates the physical location of one or more program repositories. The datagram in this example is shown as a library reference which is a pointer to a physical location.

At "step2" in operation C-1, the assembly routine receives one datagram comprising of two parameters. The first parameter is an attribute object-identifier used as container of one or more repository names, where the names are specified by the generally accepted categorization chart. The second parameter is an attribute object-identifier used as a container for program object-identifiers created from programs within the repositories specified in the first parameter.

At "step3" in operation C-1, the assembly routine iterates over the list of repository names, applies the information indicating physical program location, and obtains a listing of information that comprises the full program name, restricting the gathering process to compiled objects called classes. The full program name is assembled and stored as a single unit of information within the assembly routine, referred to as the raw data vector.

At "step4" in operation C-1, the assembly routine iterates over the items in the raw-vector using the full program name to instantiate each class. The resulting program object-identifier is stored within the assembly routine, referred to as the repository-vector.

At "step5" in operation C-1, the assembly routine iterates over the items in the repository-vector. The attribute names within each instance are searched for a specified attribute name that is used to indicate that the program object identifiers within the current repository should be sequenced for normal program execution. The attribute names are searched for an attribute named "SEQUENCE_ID." Each time the specified sequencing attribute name is located, a counter is incremented by 1, and the container element holding that program object-identifier is renamed to the same value found within "SEQUENCE_ID." If every program in the current repository has the specified sequence attribute present, a flag can be set to indicate that sorting may be required to set the execution sequence for programs within the current repository. The sequencing of programs in a repository may be helpful when implementing a union of concerns in a specified step-action sequence.

At "step6" in operation C-1, the assembly program evaluates the flag set as seen in "step5" to determine if sorting the instances located in the repository-vector is required. If sorting is required, the repository-vector can be sorted by name. This implementation results in program object identifiers that are sequenced according to data obtained from individual programs within a repository collective, where the sorting process itself is conditional on the presence of a specifically named property. A repository collective can indicate order of execution, independently of other decision logic, removing or reducing the need to hardcode program execution sequence.

At "step7" in operation C-1, the instance located in repository-vector are transferred into processed-vector. If multiple repository names are specified, the assembly program begins secondary iterations with "step4."

At "step8" in operation C-1, the assembly program transfers program object-identifiers currently within the processed-vector into the outbound instance container which was the second part of the datagram.

In accordance with one embodiment, the assembly and storage of program object-identifiers (i.e., the assembly of concerns) may involve logic for obtaining physical program names within a specified program repositories and logic for storing the object-identifier of each repository program into a specified container.

Separation of Concerns

In a separation of concerns, five program-logic structures can be identified and separated while two program-logic structures can be removed. Program statements and blocks of program statements can be separated into independent programs to create a generally accepted logic categorization chart (where the assignment of specific category identification may be subjective or object as needed). Separation of concerns may be used to separate concerns that are intended for use in union of concerns implementation during the initial application development. Separation of concerns may also be used to identify new programs that exist as separate entities. Separation of concerns may further be integrated and layered into the application during secondary development efforts.

The functionality of all computer programming languages can be listed in reference manuals as a standalone command, or as series of individual commands. In both of these cases, the commands may be divided into sections called categories, with a specific purpose fulfilled by each category. A concern is a command, or complete set of commands that fulfill one categorical process, within one logical task. A concern is encapsulated as a complete and separate program, without compile-time dependencies on other programs, and is able to exist as a separate and standalone entity.

A repository represents an encapsulation of one or more concerns where the category designation for each concern can be mapped back to the categorical divisions of commands within a reference manual. Optionally, categorically naming and mapping repository names can be extended as needed, providing the names are generally accepted and visually self-documenting. A series of repositories within one category represents a grouping of concerns, where each repository within a series may represent a group of similar functions, may represent legacy code separation from newly developed code, represents a separation of decision-logic and task-logic, and so on. The categorical naming of logic, functional, or behavioral categories can be used to create a generally accepted logic categorization chart.

A separation of concerns begins with the categorical naming of program repositories and includes the program or program series within a repository, as well as the grouping of logic statements within a program work-unit, referred to as a method. In this instance, a method may be a container for program statements and temporary property declarations. Logic within a method may be limited in content to physically separate five key structural elements:

Element A—logic initiates and monitors the execution cycle—within a single program and across multiple programs;
Element B—data that defines the execution cycle path, in terms of methods, programs, or repositories;
Element C—logic representing a decision;
Element D—logic representing a task; and
Element E—properties common to multiple programs.

A separation of concerns may also require the removal of two structural elements:

Element F—compiled commands, statements, and directives used to create a permanent parent-child structure, or used to create compile-time dependencies on other programs; and
Element G—compiled data indicating the location of associated programs or external data.

The separation of key elements provides an insulation between concerns, which can be useful in planning and implementing concerns that are "re-factored" to the lowest necessary level at the beginning of the system development life cycle. The early identification of key structural elements means that separation of concerns, integration of concerns, and union of concerns can be systematically implemented according to a generally accepted logic categorization chart. The separation of concerns organizes program code in principled ways, which allows the encapsulation of logic at increasingly granular levels without creating an overburdening structure within the application. Generally speaking, separation of concerns may be viewed as being all about the preparing modules of software for operations that include assembly, integration, and union.

Operation D-1 shows exemplary code for a standard entry point for an object-oriented application.

| OPERATION D-1: |
|---|
| init: dcl object thisProgram = __new__controller( );<br>    thisProgram.runInterface( );<br>    thisProgram.__term( );<br>    return; |

Operation D-2 sets forth exemplary code for a standard skeleton of repository program. The execution of a repository program may begin with a method commonly designated as the primary runtime interface. In this example, the primary runtime method is named "runInterface." The logic and data that defines "element A" can include the logic within "runInterface" and the data located within the property named "activeMethods." The logic in "runInterface" sequentially iterates through data items located in "activeMethods," providing the count of data items within the property named messages remains zero. A concern that alters the contents of messages must be coded in a separate method from other logic, or must be coded as a separate repository program. The expected result is that the singular task of the method named "runInterface" is the initiation and monitoring of the execution cycle.

| OPERATION D-2: |
|---|
| class controller;<br>    public list messages / (sendEvent='N'); |

```
OPERATION D-2:

public list activeMethods / (initialValue={
                                'step1',
                                'step2',
                                'step3'
                                });
    runInterface: method;
        dcl num i;
        do i=1 to listlen(activeMethods) while (listlen(messages)=0);
            call send(__self__, getitemc(activeMethods, i));
        end;
    endmethod;
    step1: method;
    endmethod;
    step2: method;
    endmethod;
    step3: method;
    endmethod;
endclass;
```

Operation D-3 shows exemplary code that uses information located in an external data container to drive the execution path of the application. The execution path within operation D-3 may be defined in terms of three methods, as detailed by the data content of the property named "activeMethods." The execution path may be outside of operation D-3 and can be defined in terms of a single program, or a series of programs, where the number of programs and sequence of execution are specified through repository names contained within the "SLIST" entity named "repositoryNames."

An illustrative content listing for "anylibrary.anyCatalog.repositoryNames.slist." (as set forth in operation D-3) is presented as follows:

```
SLIST('REPOSITORY401' {C}
      'REPOSITORY402' {C}
      'REPOSITORY403' {C}
      'REPOSITORY201' {C}
      'REPOSITORY801' {C}
}[3]
```

Figure 8:
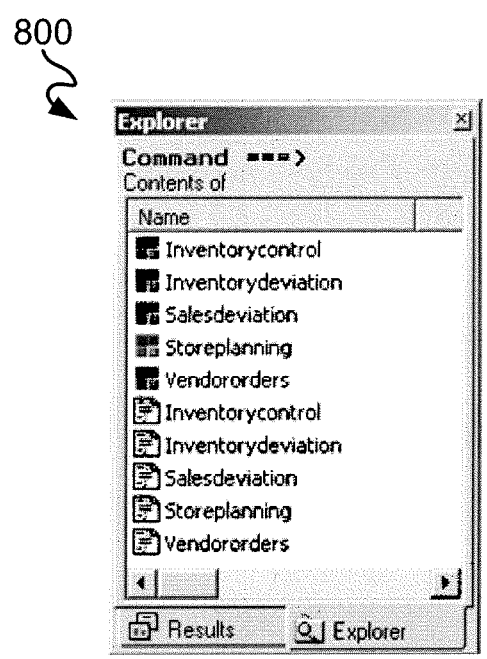
FIG. 8 is a schematic diagram of an illustrative content listing of an exemplary "anyLibary.REPOSITORY401" in accordance with the illustrative content listing for "anylibrary.anyCatalog.repositoryNames.slist"

In accordance with the illustrative content listing for "anylibrary.anyCatalog.repositoryNames.slist," FIG. 8 shows an illustrative content listing of "anyLibary.REPOSITORY401."

Operation D-4 shows exemplary code for demonstrating the implementation of logic representing a decision occurring separately from corresponding task logic. Decision logic in computer programs is generally written as a test condition, or series of test conditions, where the final result is negative, positive, or specified value. Separating the structure of decision logic from other categories of logic can be performed by storing the results of the decision condition as a unique data element located in a property that can be accessed application-wide after integration of concerns. In this example, a negative result on the test condition in method "decisionPoint" triggers one of two items to be inserted into the common property is named status. The evaluation of the test

```
OPERATION D-3:

class controller;
    public list components / (sendEvent='N');
    public list messages / (sendEvent='N');
    public list repositoryNames / (sendEvent='N');
    public list activeMethods / (initialValue={
                                    'step1',
                                    'step2',
                                    'step3'
                                    });
    runInterface: method;
        dcl num i;
        do i=1 to listlen(activeMethods) while (listlen(messages)=0);
            call send(__self__, getitemc(activeMethods, i));
        end;
    endmethod;
    step1: method / (description='access external metadata');
        dcl num rc;
        rc=fillist('CATALOG', 'anyLibary.anyCatalog.repositoryNames.slist',
            repositoryNames);
        if listlen(repositoryNames)=0 then
            rc=insertc(messages, 'absence of repository names', -1);
    endmethod;
    step2: method / (description='application assembly specified by library name');
        dcl object thisProgram=instance(loadclass('anyLibrary.anyRepository.assembly.
            class'));
        thisProgram.libraryName='ANYLIBRARY';
        thisProgam.runInterface(repositoryNames, components);
        copylist(thisProgram.messages, 'n', messages) thisProgram.__term( );
    endmethod;
    step3: method / (description='repository program execution');
        dcl num i;
        dcl object thisProgram;
        do i=1 to listlen(components) while (listlen(messages)=0);
            thisProgram=getitemo(components, i); thisProgram.runInterface( );
            copylist(thisProgram.messages, 'N', messages)
        end;
    endmethod;
endclass;
``` condition is the logic that represents a decision, while the insertion of data into the common property is a unique specified value.

OPERATION D-4:

```
class businessRule045;
    public list status / (sendEvent='N');
    runInterface: method;
        dcl num rc;
        submit continue sql;
        create table work.temp as
            select distinct anyColumnName
            from anyLibrary.anyTable;
        endsubmit;
        if symgetn('sqlobs')=0
            then rc=insertn(status, 0, -1, 'BR045A');
            else rc=insertn(status, 0, -1, 'BR045B');
    endmethod;
endclass;
```

Operation D-5 shows exemplary code for demonstrating the implementation of logic representing a task corresponding to the decision specified in operation D-5. In practice, a task concerns may contain no self-determination logic. For demonstrative purposes, the example the task concern named "task045" contains self-determination logic that evaluates the presence of a specified data value in a shared property. The structure of the task is separated from other concerns by its existence as a standalone program. Task program "task045" can be executed at any time, but the individual task implementations are only activated when a specific data value created in another application program is detected within the shared property.

OPERATION D-5:

```
class task045;
    public list status / (sendEvent='N');
    public list messages / (sendEvent='N');
    public list activeMethods / (initialValue={
                                    'task1',
                                    'task2'
                                    });
    runInterface: method;
        dcl num i;
        do i=1 to listlen(activeMethods) while (listlen(messages)=0);
            call send(__self__, getitemc(activeMethods, i));
        end;
        call send(__self__, 'cleanup');
    endmethod;
    task1: method;
        if getnitem(status, 'BR045A')=0 then return;
        * more statements ;
    endmethod;
    task2: method;
        if getnitem(status, 'BR045B')=0 then return;
        * more statements ;
    endmethod;
    cleanup: method;
        dcl num rc=clearlist(status);
    endmethod;
endclass;
```

Operation D-6 shows exemplary code for demonstrating the implementation of properties common to multiple programs. In practice, the only logic statements permitted in this category of component are statements that clear data values from properties that are specified as common, or involved in multiple ownership. Multiple ownership of a single property across multiple programs is implemented through integration of concerns.

OPERATION D-6:

```
class workspace;
    public list messages / (category='COMMON', sendEvent='N');
    public list status / (category='COMMON', sendEvent='N');
    public list dataVector / (category='COMMON', sendEvent='N');
    runInterface: method;
        dcl num rc;
        rc=clearlist(messages);
        rc=clearlist(status);
        rc=clearlist(dataVector, 'D');
    endmethod;
endclass;
```

Operation D-7 shows exemplary code for demonstrating two program directives that become deprecated when using an assembly service as seen in operation C-1. Directives that identify programs using the import statement create a hard-coded dependency on another program, creating tight-coupling between programs, which in turn creates program inflexibility. Identical problems are seen with class instantiations that specifically name a program and program location.

OPERATION D-7:

```
import anyLibrary.anyCatalog;
class anyName;
    __init: method / (state='o');
        dcl object thisProgram = __new__
            anyLibrary.anyCatalog.anyProgram.class( );
    endclass;
endclass;
```

Program relationships can be created between the implementations of decision-logic concern, integration of concerns, and task-logic concern. Hundreds of individual programs divided by category, function, and sequence can be seamlessly integrated and function as if written as a single program. Program relationships created by the additional implementation of union of concerns provides the ability to layer in new functionality as-needed without disturbing existing code.

Categorizing logic to create a generally accepted logic categorization chart can be as subjective or objective as needed, where the categorizations are used to organize relationships between programs within the application, by defining a relationship as the programs within a repository. A repository is a container, where the usage of the container in intended to be identified internally, externally, or through metadata. The numbering and naming of a repository may be insignificant. The categorization of repository containers for specific program logic representing sequential steps, segments within category, program grouping by logical feature, programs grouping by function, can be used to create a generally accepted "Dewey Decimal System" for organizing program, or for organizing relationships between programs.

The usage of a repository containing programs and metadata intended to represent a single category of logic provides the ability to zero in on specific problems, bypassing the traditional need to trace through an entire application to locate specific logic. For example, program issues related to importing data from an external data repository would be located in a data source repository (e.g., "repository401," "repository402," etc.). Issues related to the appearance of titles or footnotes on a report would only be located in a report repository (e.g., "repository801," "repository802," etc.).

Figure 9:
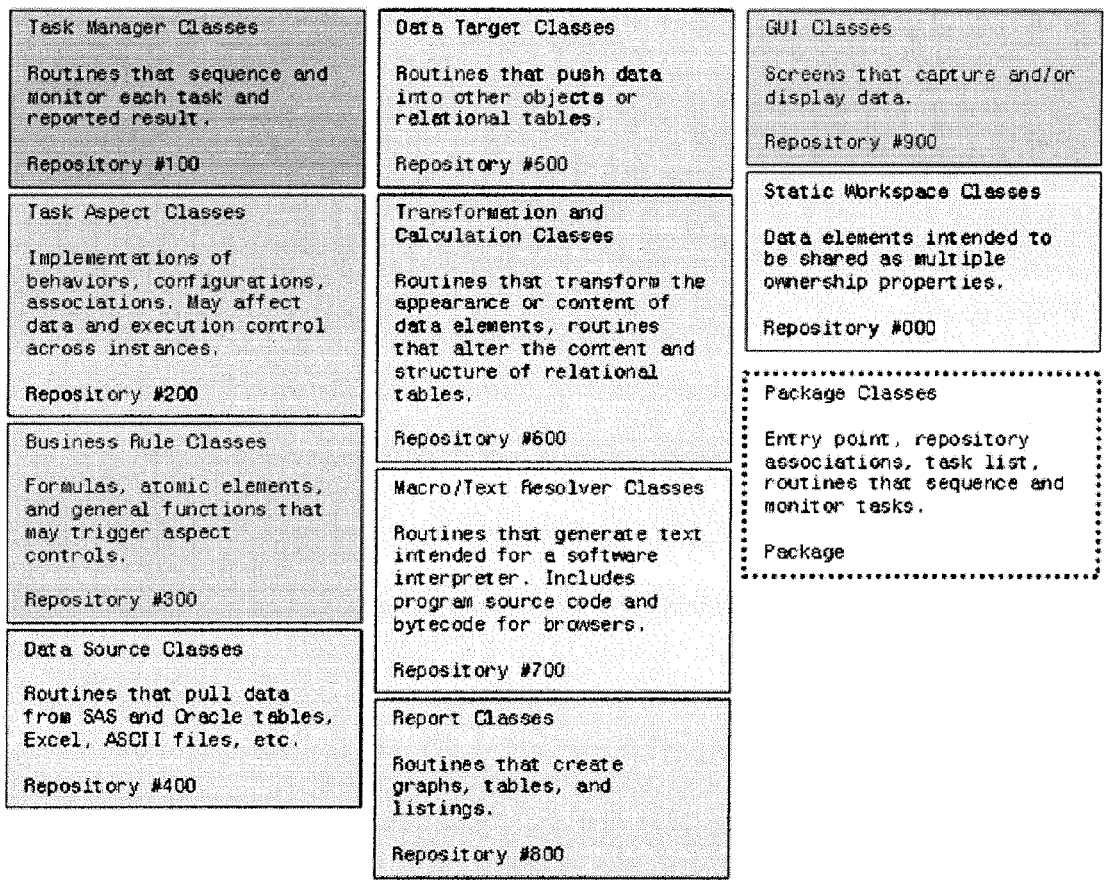
FIG. 9 is a conceptual diagram of some exemplary basic categories of computer program logic that can be used in business applications in accordance with one embodiment.

Some exemplary basic categories of computer program logic that can be used in business applications are shown in FIG. 9 and are described as follows:

(Repository #100) Task Manager—routines that sequence and monitor each task and reported result;

(Repository #200) Task Aspects—routines that consist of programmed behaviors, configurations, associations and may affect data and execution control across instances;

(Repository #300) Business Rules—routines consisting of formulas, atomic elements, and general functions that may trigger a Task Aspect;

(Repository #400) Data Source—routines that pull data from SAS and Oracle tables, Excel, ASCII files, etc.;

(Repository #500) Data Target—routines that push data into other objects or into relational tables;

(Repository #600) Transformations and Calculations—routines that transform the appearance or content of data elements, routines that alter the content and structure of relational tables;

(Repository #700) Macro/Text Resolver—routines that generate text intended for a software interpreter. Includes program source code and byte code for browsers;

(Repository #800) Reports—routines that create graphs, tables, and listings;

(Repository #900) Interactive GUI—routines that consist of visual screens that capture and/or display data;

(Repository #000) Shared Properties—data elements, called properties, that are intended to be the source object identifier for multiple ownership properties; and (User-Defined Name) Package—routines consisting of an application entry point, decision logic that associates to specific program repositories, including routines that operates on a list of tasks to be accomplished, routines that sequence and, monitor the results of each task.

Figure 10:
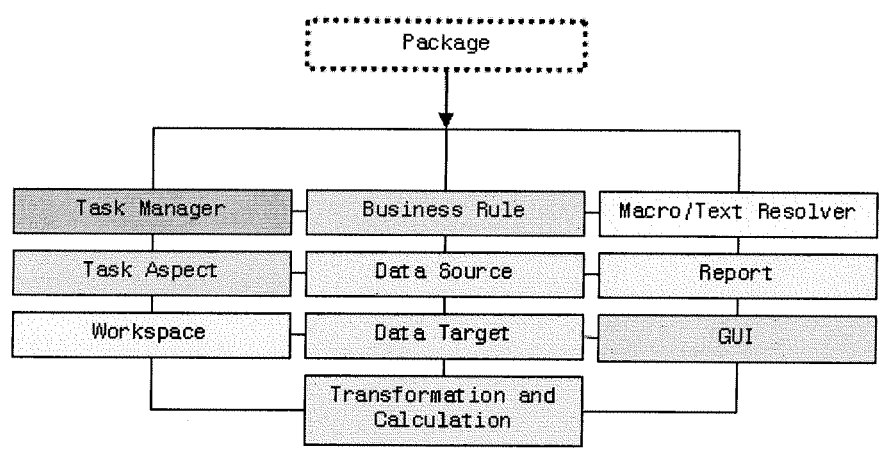
FIG. 10 is a conceptual illustrating an hierarchical relationship between a package and a repository.

FIG. 10 is a conceptual diagram illustrating a hierarchical relationship between a package 1002 and a repository 1004.

In accordance with one embodiment, the categorizing program logic statements and program logic blocks into separate containers (i.e., the separation of concerns) may involve the identification and classification of program logic statements and program logic blocks according to a generally accepted logic categorization chart. Each identified concern (or series of concerns) may be separated according to at least one of functionality, sequence, and usage, based in principal on the generally accepted logic categorization chart. Each identified concern (or series of concerns) may be encapsulated as separate and self contained program within a repository whose physical name maps to the generally accepted logic categorization chart.

Figure 11:
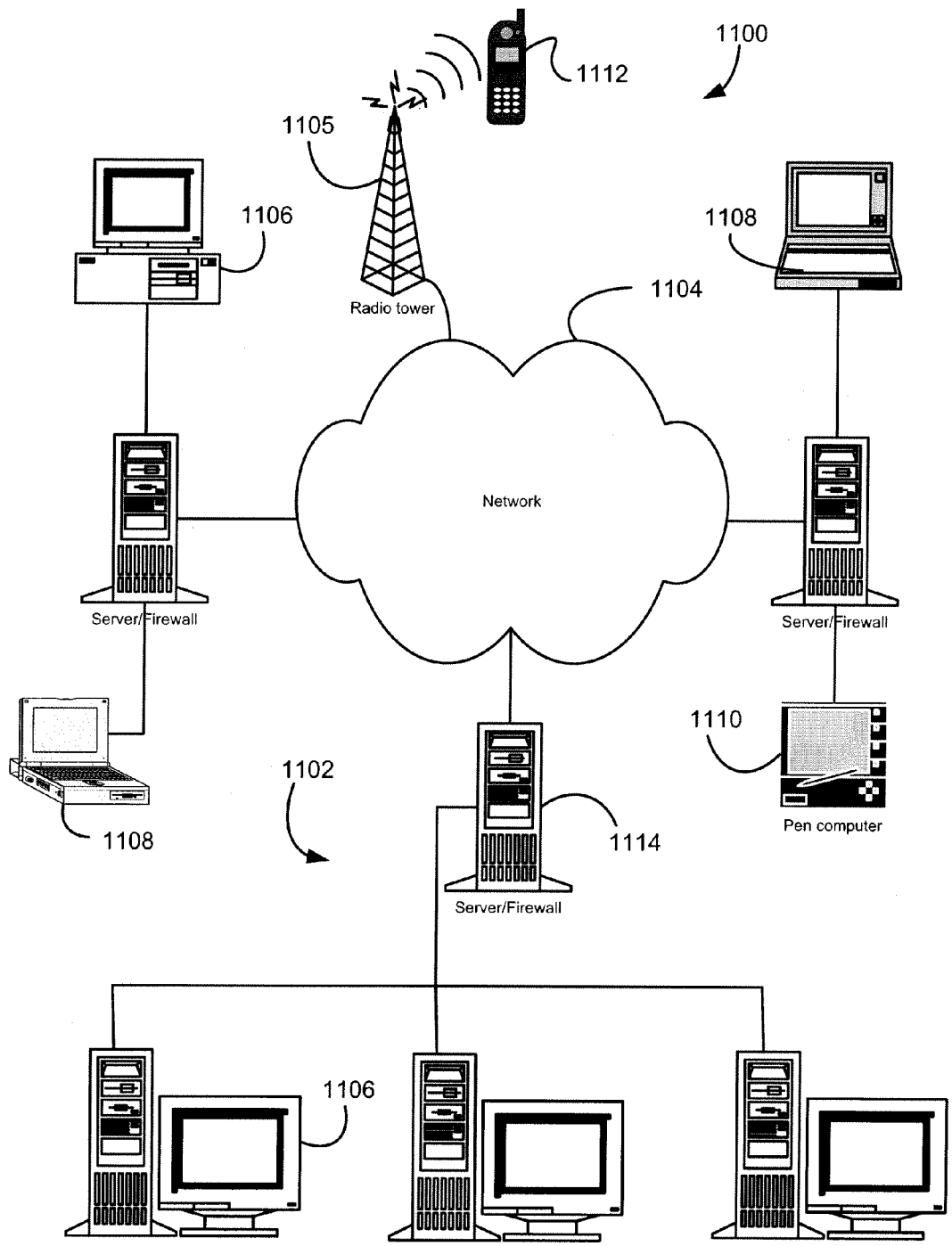
FIG. 11 is a schematic diagram of an illustrative network system in accordance with an exemplary embodiment.

FIG. 11 illustrates an exemplary network system 1100 with a plurality of components 1102 in accordance with one embodiment. As shown, such components include a network 1104 which take any form including, but not limited to a local area network, a wide area network such as the Internet, and a wireless network 1105. Coupled to the network 1104 is a plurality of computers which may take the form of desktop computers 1106, lap-top computers 1108, hand-held computers 1110 (including wireless devices 1112 such as wireless PDA's or mobile phones), or any other type of computing hardware/software. As an option, the various computers may be connected to the network 1104 by way of a server 1114 which may be equipped with a firewall for security purposes. It should be noted that any other type of hardware or software may be included in the system and be considered a component thereof.

Figure 12:
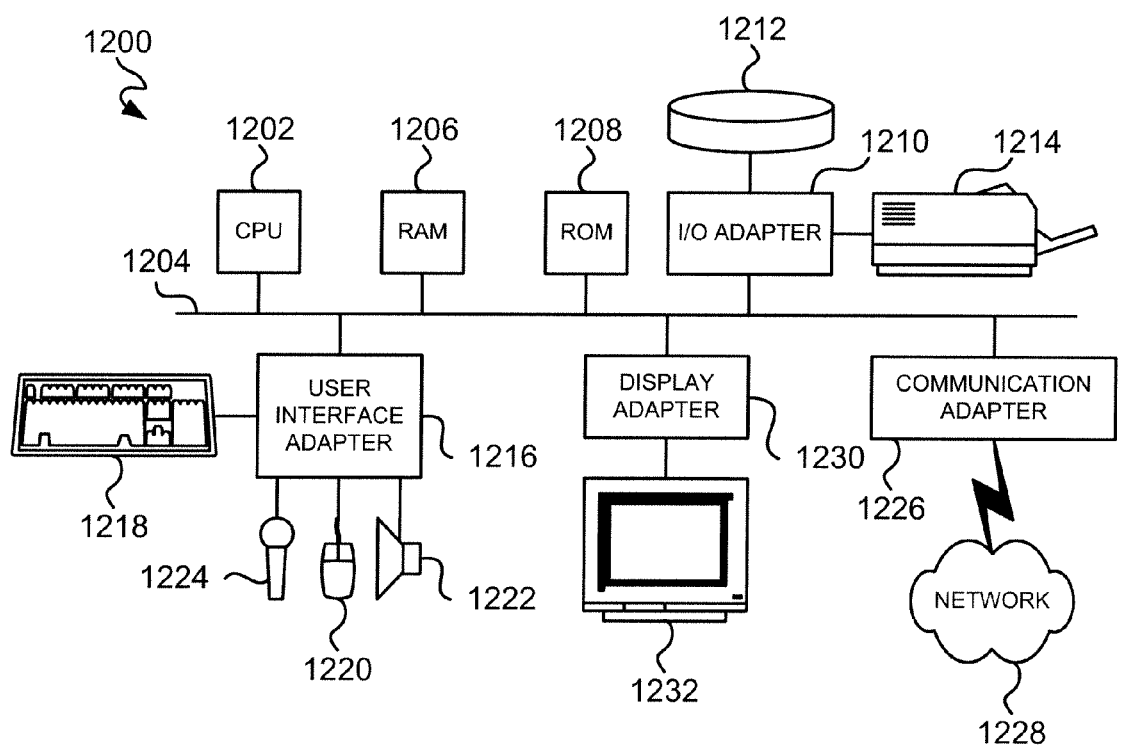
FIG. 12 is a schematic diagram of a representative hardware environment in accordance with one embodiment.

A representative hardware environment associated with the various components of FIG. 11 is depicted in FIG. 12. In the present description, the various sub-components of each of the components may also be considered components of the system. For example, particular software modules executed on any component of the system may also be considered components of the system. In particular, FIG. 12 illustrates an exemplary hardware configuration of a computer 1200 having a central processing unit 1202, such as a microprocessor, and a number of other units interconnected via a system bus 1204. The computer 1200 shown in FIG. 12 includes a Random Access Memory (RAM) 1206, Read Only Memory (ROM) 1208, an I/O adapter 1210 for connecting peripheral devices such as, for example, disk storage units 1212 and printers 1214 to the bus 1204, a user interface adapter 1216 for connecting various user interface devices such as, for example, a keyboard 1218, a mouse 1220, a speaker 1222, a microphone 1224, and/or other user interface devices such as a touch screen or a digital camera to the bus 1204, a communication adapter 1226 for connecting the computer 1200 to a communication network 1228 (e.g., a data processing network) and a display adapter 1230 for connecting the bus 1204 to a display device 1232. The computer may utilize an operating system such as, for example, a Microsoft Windows operating system (O/S), a Macintosh O/S, a Linux O/S and/or a UNIX O/S. Those of ordinary skill in the art will appreciate that embodiments may also be implemented on platforms and operating systems other than those mentioned. One of ordinary skilled in the art will also be able to combine software with appropriate general purpose or special purpose computer hardware to create a computer system or computer sub-system for implementing various embodiments described herein. It should be understood the use of the term logic may be defined as hardware and/or software components capable of performing/executing sequence(s) of functions. Thus, logic may comprise computer hardware, circuitry (or circuit elements) and/or software or any combination thereof.

The embodiments set forth herein have been described in relation to programs written using the SAS System. Embodiments of the present invention may also be implemented using computer program languages such as, for example, ActiveX, Java, C, and the C++ language and utilize object oriented programming methodology. Any such resulting program, having computer-readable code, may be embodied or provided within one or more computer-readable media, thereby making a computer program product (i.e., an article of manufacture). The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

Some benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Sun Microsystems defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

JavaScript is an interpreted programming or script language from Netscape. It is somewhat similar in capability to Microsoft's Visual Basic, Sun's Tcl, the UNIX-derived Perl, and IBM's REX. In general, script languages are easier and faster to code in than the more structured and compiled languages such as C and C++. JavaScript is used in Web site development to do such things as: automatically change a formatted date on a Web page; cause a linked-to page to appear in a popup window; and cause text or a graphic image to change during a mouse rollover.

JavaScript uses some of the same ideas found in Java. JavaScript code can be imbedded in HTML pages and interpreted by the Web browser (or client). JavaScript can also be run at the server as in Microsoft's Active Server Pages before the page is sent to the requestor. Both Microsoft and Netscape browsers support JavaScript.

Another technology that provides similar function to Java is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for Java without undue experimentation to practice the invention.

A technology of Active X is the component object model (COM). Used in a network with a directory and additional support, COM becomes the distributed component object model (DCOM). The main thing that you create when writing a program to run in the ActiveX environment is a component, a self-sufficient program that can be run anywhere in your ActiveX network. This component is known as an ActiveX control. ActiveX is Microsoft's answer to the Java technology from Sun Microsystems. An ActiveX control is roughly equivalent to a Java applet. OCX stands for "Object Linking and Embedding control." Object Linking and Embedding (OLE) was Microsoft's program technology for supporting compound documents such as the Windows desktop. The Component Object Model now takes in OLE as part of a larger concept. Microsoft now uses the term "ActiveX control" instead of "OCX" for the component object. An advantage of a component is that it can be re-used by many applications (referred to as component containers). A COM component object (ActiveX control) can be created using one of several languages or development tools, including C++ and Visual Basic, or PowerBuilder, or with scripting tools such as VBScript.

Serialization involves saving the current state of an object to a stream, and restoring an equivalent object from that stream. The stream functions as a container for the object. Its contents include a partial representation of the object's internal structure, including variable types, names, and values. The container may be transient (RAM-based) or persistent (disk-based). A transient container may be used to prepare an object for transmission from one computer to another. A persistent container, such as a file on disk, allows storage of the object after the current session is finished. In both cases the information stored in the container can later be used to construct an equivalent object containing the same data as the original. The example code in this article will focus on persistence.

Inheritance may be defined as a relationship that defines one entity in terms of another. Class inheritance defines a new class in terms of one or more parent classes. The new class may inherit its interface and implementation from its parent class(es). The new class is called a subclass or a derived class. Class inheritance may combine interface inheritance and implementation inheritance. Interface inheritance defines a new interface in terms of one or more existing interfaces while implementation inheritance defines a new implementation in terms of one or more existing implementations. In object-oriented programming, inheritance may further be defined as an ability to create new classes (or interfaces) that contain all the methods and properties of another class (or interface), plus additional methods and properties. For example, if class (or interface) "B" inherits from class (or interface) "A", then class B is said to be derived from class A. Class B may be referred to as a base (or super) class (or interface) for class D. When a class of objects is defined, any subclass that is defined may inherit the definition of one or more general classes. In the case where some modification to the definition is needed in the subclass, new methods and/or properties may be included in the definition.

A bit stream may be defined as a continuous transfer of bits over some medium. For example, a bit stream may comprise a series of transmitted bits through a transmission link.

A superclass (as referred to as a base or parent class) is one from which other classes are derived using inheritance. In class inheritance, the subclass is said to inherit its interface and implementation from its superclass(es). In object orientated programming, a superclass may be a class that is above another class in the class hierarchy. For example, class "A" may be a superclass of class "B" if classes A and B are on the same branch of a class hierarchy tree and class A is higher on that branch than class B.

In general, introspection may comprise the ability of an object to reveal information about itself as an object such as for example, the object's class, superclass), the messages the object is capable of responding to, and the protocols to which the object conforms. In Java, introspection may further comprise a process by which a class is read in order to create a representation of the object's application program interface (API). Introspection may be carried out by the Java Introspector class, which is part of the Java Core Reflection API. Introspection may be used to provide additional information about an object, supplementing information learned by reflection.

Run-time may be defined as a time during which a program is active and being executed or executing (i.e., the time the program is being run).

Design time may be defined as a time during which an application is being built in a development environment/process. Code may be created and edited during design time.

Transmission Control Protocol/Internet Protocol (TCP/IP) is a basic communication language or protocol of the Internet. It can also be used as a communications protocol in the private networks called intranet and in extranet. TCP/IP is a two-layering program. The higher layer, Transmission Control Protocol or TCP, manages the assembling of a message or file into smaller packet that are transmitted over the Internet and received by a TCP layer that reassembles the packets into the original message. The lower layer, Internet Protocol or IP, handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received). Several higher layer application protocols use TCP/IP to get to the Internet. These include the World Wide Web's Hypertext Transfer Protocol (HTTP), the File Transfer Protocol (FTP), Telnet, and the Simple Mail Transfer Protocol (SMTP). These and other protocols are often packaged together with TCP/IP as a "suite." Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does). Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Encryption is the conversion of data into a form, called a ciphertext, that cannot be easily understood by unauthorized people. Decryption is the process of converting encrypted data back into its original form, so it can be understood. Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is often included as part of a web browser. The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet. The private key is used to decrypt text that has been encrypted with the public key. Thus, if a first party sends a message to a second party, the recipient second party may be able to find out the first party's public key (but not the first party's private key) from a central administrator and encrypt a reply message back to the first party using the first party's own public key. When the first party receives the reply message, the reply message may be decrypted by the first party with the first party's private key. In addition to encrypting messages (which ensures privacy), a first party may be able authenticate themselves to second party so that the second party can confirm the identity of the first party (and thus know that it is really the first party who sent the message) by using a private key to encrypt a digital certificate. When the second party receives the encrypted digital certificate, the second party may use the first party's public key to decrypt it.

A browser is an application program that provides a way to look at and interact with all the information on the World Wide Web. The word "browser" seems to have originated prior to the Web as a generic term for user interfaces that let you browse (navigate through and read) text files online. A Web browser may be considered a client program that uses the Hypertext Transfer Protocol (HTTP) to make requests of Web servers throughout the Internet on behalf of the browser user. While some browsers also support e-mail (indirectly through e-mail Web sites) and the File Transfer Protocol (FTP), a Web browser may not be required for those Internet protocols and more specialized client programs are more popular.

A pop-up is a graphical user interface (GUI) display area, usually a small window, that suddenly appears ("pops up") in the foreground of the visual interface. Pop-ups can be initiated by a single or double mouse click or rollover (sometimes called a mouseover), and also possibly by voice command or can simply be timed to occur. A pop-up window is usually smaller than the background window or interface; otherwise, it is may be called a replacement interface. On the World Wide Web, JavaScript (and less commonly Java applets) may be used to create interactive effects including pop-up and full overlay windows. A menu or taskbar pulldown can be considered a form of pop-up. So can the little message box you get when you move your mouse over taskbars in many PC applications.

Plug-in applications are programs that can easily be installed and used as part of your Web browser. A plug-in application is recognized automatically by the browser and its function is integrated into the main HTML file that is being presented.

Based on the foregoing specification, embodiments of the invention may be implemented using computer programming or engineering techniques including computer software, firmware, hardware or any combination or subset thereof. Any such resulting program—having computer-readable code—may be embodied or provided in one or more computer-readable media, thereby making a computer program product (i.e., an article of manufacture) implementation of one or more embodiments described herein. The computer readable media may be, for instance, a fixed drive (e.g., a hard drive), diskette, optical disk, magnetic tape, semiconductor memory such as for example, read-only memory (ROM), flash-type memory, etc., and/or any transmitting/receiving medium such as the Internet and/or other communication network or link. An article of manufacture containing the computer code may be made and/or used by executing the code directly from one medium, by copying the code from one medium to another medium, and/or by transmitting the code over a network. In addition, one of ordinary skill in the art of computer science may be able to combine the software created as described with appropriate general purpose or special purpose computer hardware to create a computer system or computer sub-system embodying embodiments or portions thereof described herein.

Special thanks to Lynet Prum, Phnom Penh, Cambodia.

While various embodiments have been described, they have been presented by way of example only, and not limitation. Thus, the breadth and scope of any embodiment should not be limited by any of the above described exemplary embodiments, but should be defined only in accordance with the following claims and their equivalents.

What is claimed:

1. A method, comprising:
   categorically separating programmed logic from one or more programs into a plurality of object class files organized into a plurality of repositories, each repository named to identify a relationship, wherein each program is a complete and separate compiled program without compile-time dependencies on other programs;
   during runtime of the one or more programs, accessing a repository location container identifying the name and location of at least one the repositories that is to be related to one or more other of the repositories during instantiation;
   during said runtime, instantiating object class files in each repository identified in the repository location container into a plurality of executable instances in memory, wherein the created executable instances are separated into at least one repository of source instances, one or more repository of target instances;
   examining during said runtime each of the source instances to collect information about one or more properties therein that is capable of being used as a source property, each source property having a unique source identifier associated therewith;
   examining during said runtime each of the target instances to collect information about one or more properties therein that is capable of being used as a target property;
   using the collected information to identify matches between the source properties and target properties; and
   for each match, dynamically assigning to the target property during said runtime the unique source identifier of the corresponding source property to enable a static pathway for information traversals between the related source and target instances.

2. The method of claim 1, further comprising:
   identifying during runtime one or more of the source instances intended for modification;
   locating in each of the identified source instances a union initiation point from where an execution pointer jumps from that source instance to the one or more corresponding target instances that have been matched to the source instance;
   dynamically creating in memory during runtime a union transmitter in each identified source instance, the union transmitter comprising a unique identifier that identifies the corresponding source instance and timing for the corresponding union initiation point; and
   dynamically creating in memory during runtime in each corresponding inclusion instance a corresponding union receptor that matches to a corresponding union transmitter, the union receptor comprising a unique identifier that constrains instance execution to a corresponding union transmitter in a corresponding baseline instance.

3. The method of claim 2, wherein each union receptor is constrained during runtime to the matching union transmitter.

4. The method of claim 1, further comprising sequentially executing and monitoring blocks of programmed logic for specific messages in one of the programs having execution paths that cross at least one other program.

5. The method of claim 1, wherein the object class files from each repository identified in the repository location container are instantiated dynamically.

6. The method of claim 1, wherein the source instances and the target instances are sorted during runtime to create a specific execution sequence based on metadata found in the instances.

7. The method of claim 6, wherein the specific execution sequence exists independently of other programmed decision logic and is created, during runtime, from at least one of: data within instances; sequence of repository instantiation; and name sequence of class object files within a repository.

8. The method of claim 1, wherein the source and target instances are examined during runtime to identify attributes named beans, wherein program object-identifiers associated with beans are copied into the identified attributes.

9. The method of claim 1, wherein the categorical separating of program logic includes separating program logic that initiates and monitors an execution cycle.

10. The method of claim 1, wherein the categorical separating of program logic includes separating program logic that represents a decision.

11. The method of claim 1, wherein the categorical separating of program logic includes separating program logic that represents a task.

12. The method of claim 1, wherein the categorical separating of program logic includes separating properties in program logic that is common to a plurality of programs.

13. The method of claim 1, wherein the repository location container is physically separate from compiled object class files.

14. The method of claim 1, wherein the instances are further separated into at least one repository of bean instances.

15. A system, comprising:
   a computer having:
   logic that categorically separates programmed logic from one or more programs into a plurality of object class files organized into a plurality of repositories, each repository named to identify a relationship, wherein each program is a complete and separate compiled program without compile-time dependencies on other programs;
   logic that, during runtime of the one or more programs, accesses a repository location container identifying the name and location of at least one the repositories that is to be related to one or more other of the repositories during instantiation;
   logic that, during said runtime, instantiates object class files in each repository identified in the repository location container into a plurality of executable instances in memory, wherein the created executable instances are separated into at least one repository of source instances, one or more repository of target instances;
   logic that examines during said runtime each of the source instances to collect information about one or more properties therein that is capable of being used as a source property, each source property having a unique source identifier associated therewith;
   logic that examines during said runtime each of the target instances to collect information about one or more properties therein that is capable of being used as a target property;

logic that uses the collected information to identify matches between the source properties and target properties; and logic that, for each match, dynamically assigns to the target property during said runtime the unique source identifier of the corresponding source property to enable a static pathway for information traversals between the related source and target instances.

16. A system, comprising:

a circuit element that categorically separates programmed logic from one or more programs into a plurality of object class files organized into a plurality of repositories, each repository named to identify a relationship, wherein each program is a complete and separate compiled program without compile-time dependencies on other programs;

a circuit element that, during runtime of the one or more programs, accesses a repository location container identifying the name and location of at least one the repositories that is to be related to one or more other of the repositories during instantiation;

a circuit element that, during said runtime, instantiates object class files in each repository identified in the repository location container into a plurality of executable instances in memory, wherein the created executable instances are separated into at least one repository of source instances, one or more repository of target instances;

a circuit element that examines during said runtime each of the source instances to collect information about one or more properties therein that is capable of being used as a source property, each source property having a unique source identifier associated therewith;

a circuit element that examines during said runtime each of the target instances to collect information about one or more properties therein that is capable of being used as a target property;

a circuit element that uses the collected information to identify matches between the source properties and target properties; and a circuit element that, for each match, dynamically assigns to the target property during said runtime the unique source identifier of the corresponding source property to enable a static pathway for information traversals between the related source and target instances.

* * * * *